(12) United States Patent
Yang et al.

(10) Patent No.: US 12,356,412 B2
(45) Date of Patent: Jul. 8, 2025

(54) MULTIPLEXING UPLINK CONTROL INFORMATION ON UPLINK SHARED CHANNEL TRANSMISSIONS

(71) Applicant: QUALCOMM Incorporated, San Diego, CA (US)

(72) Inventors: Wei Yang, San Diego, CA (US); Seyed Ali Akbar Fakoorian, San Diego, CA (US); Kianoush Hosseini, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/462,350

(22) Filed: Sep. 6, 2023

(65) Prior Publication Data

US 2023/0422252 A1 Dec. 28, 2023

Related U.S. Application Data

(63) Continuation of application No. 17/001,326, filed on Aug. 24, 2020, now Pat. No. 11,778,617.

(Continued)

(51) Int. Cl.
*H04W 72/21* (2023.01)
*H04L 1/00* (2006.01)
(Continued)

(52) U.S. Cl.
CPC ........... *H04W 72/21* (2023.01); *H04L 1/0061* (2013.01); *H04L 1/0067* (2013.01); *H04L 5/0055* (2013.01); *H04W 72/23* (2023.01)

(58) Field of Classification Search
None
See application file for complete search history.

(56) References Cited

U.S. PATENT DOCUMENTS

| 10,477,526 B2 | 11/2019 | Chendamarai et al. |
| 10,873,415 B2 | 12/2020 | Babaei et al. |

(Continued)

FOREIGN PATENT DOCUMENTS

| TW | 201926931 A | 7/2019 |
| WO | WO-2017214612 A1 | 12/2017 |
| WO | WO-2018141903 A1 | 8/2018 |

OTHER PUBLICATIONS

Samsung, "Remaining Issues on PUCCH", Aug. 20-24, 2018, 3GPP TSG RAN WG1 #94, R1-1808754 pp. 1-7 (Year: 2018).*

(Continued)

*Primary Examiner* — Steve R Young
(74) *Attorney, Agent, or Firm* — Holland & Hart LLP/Qualcomm

(57) ABSTRACT

Methods, systems, and devices for wireless communications are described. A user equipment (UE) may receive an uplink grant that schedules uplink shared channel transmissions of a first length. The UE may then determine the actual lengths of the transmissions, which may differ from each other and the scheduled length (e.g., due to conditions of the communication environment, such as the location of slot boundaries). The UE may also identify uplink control information to be multiplexed on the uplink shared channel (e.g., when the scheduled transmission overlaps with a control channel or based on an uplink grant for the uplink control information). The UE may multiplex the uplink control information on the uplink shared channel so as to maintain the same rate-matching scheme and the same coding scheme for each of the transmissions, and transmit the uplink control information in at least one of the transmissions.

28 Claims, 11 Drawing Sheets

Related U.S. Application Data

(60) Provisional application No. 62/976,964, filed on Feb. 14, 2020, provisional application No. 62/892,460, filed on Aug. 27, 2019.

(51) Int. Cl.
  H04L 5/00 (2006.01)
  H04W 72/23 (2023.01)

(56) References Cited

U.S. PATENT DOCUMENTS

| | | |
|---|---|---|
| 2012/0127948 A1 | 5/2012 | Chung et al. |
| 2017/0135090 A1 | 5/2017 | Yin et al. |
| 2017/0273056 A1 | 9/2017 | Papasakellariou |
| 2018/0048498 A1 | 2/2018 | Stern-Berkowitz et al. |
| 2018/0279327 A1 | 9/2018 | Ying et al. |
| 2019/0053211 A1* | 2/2019 | Ying ............... H04W 72/044 |
| 2019/0059013 A1 | 2/2019 | Rahman et al. |
| 2019/0069321 A1 | 2/2019 | Akkarakaran et al. |
| 2019/0199477 A1* | 6/2019 | Park ............... H04L 1/0026 |
| 2019/0215823 A1* | 7/2019 | Kim ............... H04L 1/0031 |
| 2020/0205148 A1 | 6/2020 | Yoshioka et al. |
| 2020/0236673 A1* | 7/2020 | Xu ............... H04L 1/0028 |
| 2020/0383105 A1* | 12/2020 | Park ............... H04L 1/1896 |
| 2021/0022158 A1* | 1/2021 | Wei ............... H04L 1/0025 |
| 2021/0058919 A1 | 2/2021 | Takeda et al. |
| 2021/0058922 A1 | 2/2021 | Han et al. |
| 2021/0068140 A1 | 3/2021 | Yang et al. |
| 2022/0174722 A1* | 6/2022 | Talarico ............... H04W 72/23 |
| 2022/0191867 A1* | 6/2022 | Papasakellariou ........................... H04W 72/0453 |

OTHER PUBLICATIONS

ETRI: "Potential Enhancements to PUSCH", 3GPP Draft, 3GPP TSG RAN WG1 #96, R1-1902443, Potential Enhancements to PUSCH—Final, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051600139, 8 pages, the whole document.

International Preliminary Report on Patentability—PCT/US2020/047745 The International Bureau of WIPO—Geneva, Switzerland, Mar. 10, 2022.

International Search Report and Written Opinion—PCT/US2020/047745—ISA/EPO—Oct. 16, 2020.

LG Electronics: "PUSCH Enhancements for NR URLLC," 3GPP Draft, 3GPP TSG RAN WG1 #96, R1-1902047, PUSCH Enhancements for NR URLLC, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051599743, 9 pages, pp. 1-6.

Samsung: "Remaining Issues on PUCCH", 3GPP Draft, 3GPP TSG RAN WG1 #94, R1-1808754, PUCCH, 3rd Generation Partnership Project (3GPP), Mobile Competence Centre, 650, Route Des Lucioles, F-06921, Sophia-Antipolis Cedex, France, vol. RAN WG1, No. Gothenburg, Korea, Aug. 20, 2018-Aug. 24, 2018, Aug. 11, 2018 (Aug. 11, 2018), XP051516127, 7 pages, the whole document.

Samsung: "Remaining Issues on PUCCH", 3GPP TSG RAN WG1 #94, R1-1808754, Gothenburg, Korea, Aug. 20-24, 2018, pp. 1-7, Part 2.

Taiwan Search Report—TW109129091—TIPO—Jun. 13, 2024 (194871TW).

* cited by examiner

MULTIPLEXING UPLINK CONTROL INFORMATION ON UPLINK SHARED CHANNEL TRANSMISSIONS

CROSS REFERENCE

The present Application for Patent is a Continuation of U.S. patent application Ser. No. 17/001,326 by YANG et al., entitled "MULTIPLEXING UPLINK CONTROL INFORMATION ON UPLINK SHARED CHANNEL TRANSMISSIONS" filed Aug. 24, 2020, which claims the benefit of U.S. Provisional Patent Application No. 62/892,460 by YANG et al., entitled "MULTIPLEXING UPLINK CONTROL INFORMATION ON UPLINK SHARED CHANNEL TRANSMISSIONS," filed Aug. 27, 2019, and the benefit of U.S. Provisional Patent Application No. 62/976,964 by YANG et al., entitled "MULTIPLEXING UPLINK CONTROL INFORMATION ON UPLINK SHARED CHANNEL TRANSMISSIONS," filed Feb. 14, 2020, each of which is assigned to the assignee hereof, and each of which is expressly incorporated by reference herein.

FIELD OF TECHNOLOGY

The following relates generally to wireless communications and more specifically to multiplexing uplink control information on uplink shared channel transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may transmit the same uplink shared channel multiple times. In some instances the multiple transmissions may be scheduled as repetitions and may increase reliability. In other instances, the multiple transmissions may arise due to a scheduled transmission being broken into more than one actual transmission. Uplink control information (UCI) may be multiplexed on the uplink shared channel in each of the multiple transmissions. Each of the multiple transmissions will have an associated coding scheme when multiplexing the UCI on the uplink shared channel. But in certain situations, multiple coding schemes used for the transmission repetitions may make it difficult for a base station to combine and receive the UCI in the multiple repetitions.

SUMMARY

The described techniques relate to improved methods, systems, devices, and apparatuses that support multiplexing uplink control information on uplink shared channel transmissions. Generally, the described techniques provide for enabling a user equipment (UE) to prevent changes in coding schemes when multiplexing uplink control information (UCI) on uplink shared channel transmissions of different lengths. The UE may receive an uplink grant (e.g., in downlink control information (DCI) or via radio resource control (RRC) signaling) that schedules transmissions of a first length. The UE may then determine the actual lengths of the transmissions, which may differ from each other and the scheduled length (e.g., due to conditions of the communication environment, such as the location of slot boundaries). The UE may also identify UCI to be multiplexed on the uplink shared channel (e.g., when the scheduled transmission overlaps with a physical uplink control channel (PUCCH) or based on an uplink grant for the UCI). The UE may multiplex the UCI on the uplink shared channel so as to maintain the same rate-matching scheme and the same coding scheme for each of the transmissions, and transmit the UCI in at least one of the transmissions.

A method of wireless communications is described. The method may include receiving an uplink grant that schedules a transmission of an uplink shared channel using a first number of symbols, identifying, based on the uplink grant, at least a first uplink transmission opportunity and a second uplink transmission opportunity during which the uplink shared channel is to be transmitted, where at least one of the first uplink transmission opportunity or the second uplink transmission opportunity includes a second number of symbols different from the first number of symbols allocated for the uplink shared channel, identifying UCI to be multiplexed on the uplink shared channel during at least one of the first uplink transmission opportunity and the second uplink transmission opportunity, multiplexing the UCI on the uplink shared channel so as to maintain a same rate-matching scheme and a same coding scheme for each of the first uplink transmission opportunity and the second uplink transmission opportunity, and transmitting the uplink shared channel and the UCI during the at least one of the first uplink transmission opportunity and the second uplink transmission opportunity.

An apparatus for wireless communications is described. The apparatus may include a processor, memory coupled with the processor, and instructions stored in the memory. The instructions may be executable by the processor to cause the apparatus to receive an uplink grant that schedules a transmission of an uplink shared channel using a first number of symbols, identify, based on the uplink grant, at least a first uplink transmission opportunity and a second uplink transmission opportunity during which the uplink shared channel is to be transmitted, where at least one of the first uplink transmission opportunity or the second uplink transmission opportunity includes a second number of symbols different from the first number of symbols allocated for the uplink shared channel, identify UCI to be multiplexed on the uplink shared channel during at least one of the first uplink transmission opportunity and the second uplink transmission opportunity, multiplex the UCI on the uplink shared channel so as to maintain a same rate-matching scheme and a same coding scheme for each of the first uplink transmission opportunity and the second uplink transmission opportunity, and transmit the uplink shared channel and the UCI during the at least one of the first uplink transmission opportunity and the second uplink transmission opportunity.

Another apparatus for wireless communications is described. The apparatus may include means for receiving an uplink grant that schedules a transmission of an uplink shared channel using a first number of symbols, identifying, based on the uplink grant, at least a first uplink transmission opportunity and a second uplink transmission opportunity during which the uplink shared channel is to be transmitted, where at least one of the first uplink transmission opportunity or the second uplink transmission opportunity includes a second number of symbols different from the first number of symbols allocated for the uplink shared channel, identifying UCI to be multiplexed on the uplink shared channel during at least one of the first uplink transmission opportunity and the second uplink transmission opportunity, multiplexing the UCI on the uplink shared channel so as to maintain a same rate-matching scheme and a same coding scheme for each of the first uplink transmission opportunity and the second uplink transmission opportunity, and transmitting the uplink shared channel and the UCI during the at least one of the first uplink transmission opportunity and the second uplink transmission opportunity.

A non-transitory computer-readable medium storing code for wireless communications is described. The code may include instructions executable by a processor to receive an uplink grant that schedules a transmission of an uplink shared channel using a first number of symbols, identify, based on the uplink grant, at least a first uplink transmission opportunity and a second uplink transmission opportunity during which the uplink shared channel is to be transmitted, where at least one of the first uplink transmission opportunity or the second uplink transmission opportunity includes a second number of symbols different from the first number of symbols allocated for the uplink shared channel, identify UCI to be multiplexed on the uplink shared channel during at least one of the first uplink transmission opportunity and the second uplink transmission opportunity, multiplex the UCI on the uplink shared channel so as to maintain a same rate-matching scheme and a same coding scheme for each of the first uplink transmission opportunity and the second uplink transmission opportunity, and transmit the uplink shared channel and the UCI during the at least one of the first uplink transmission opportunity and the second uplink transmission opportunity.

Some examples of the method, apparatuses, and non-transitory computer-readable medium described herein may further include operations, features, means, or instructions for allocating a first quantity of resource elements in the first uplink transmission opportunity to the UCI based on the rate-matching scheme and the coding scheme, and allocating a second quantity of resource elements in the second uplink transmission opportunity to the UCI based on the rate-matching scheme and the coding scheme, where the second quantity may be different from the first quantity.

Some examples of the method, apparatuses, and non-transitory computer-readable medium described herein may further include operations, features, means, or instructions for determining that at least one uplink shared channel in the first uplink transmission opportunity or the second uplink transmission opportunity includes the first number of symbols allocated for the uplink shared channel and at least one uplink shared channel in the first uplink transmission opportunity or the second uplink transmission opportunity includes the second number of symbols different from the first number of symbols, multiplexing the UCI on the at least one uplink shared channel that includes the first number of symbols, and refraining from multiplexing the UCI on the at least one uplink shared channel that includes the second number of symbols.

Some examples of the method, apparatuses, and non-transitory computer-readable medium described herein may further include operations, features, means, or instructions for determining the uplink shared channel includes an ultra-reliable low latency communications (URLLC) transmission, determining the UCI includes a first portion and a second portion, and multiplexing the first portion of the UCI with the URLLC transmission.

Some examples of the method, apparatuses, and non-transitory computer-readable medium described herein may further include operations, features, means, or instructions for determining a payload size of the UCI, and determining a quantity of resource elements for transmitting the UCI.

Some examples of the method, apparatuses, and non-transitory computer-readable medium described herein may further include operations, features, means, or instructions for determining the payload size of the UCI may be above a threshold, and determining a reference quantity of resource elements for the UCI.

Some examples of the method, apparatuses, and non-transitory computer-readable medium described herein may further include operations, features, means, or instructions for determining an output sequence length based on the reference quantity of resource elements and the rate-matching scheme, encoding the UCI into a sequence of coded bits using polar coding, a length of the sequence of coded bits corresponding to the output sequence length, determining a quantity of coded bits based on the quantity of resource elements for transmitting the UCI, and generating the quantity of coded bits based on the sequence of coded bits.

In some examples of the method, apparatuses, and non-transitory computer-readable medium described herein, generating the quantity of coded bits may include operations, features, means, or instructions for determining the quantity of coded bits may be greater than the output sequence length, and cyclically extending the sequence of coded bits.

In some examples of the method, apparatuses, and non-transitory computer-readable medium described herein, the reference quantity of resource elements for the UCI includes a first quantity of resource elements in the scheduled transmission of the uplink shared channel; a second quantity of resource elements in the first uplink transmission opportunity; a third quantity of resource elements in the second uplink transmission opportunity; the greater of the first quantity, the second quantity, and the third quantity; or the lesser of the first quantity, the second quantity, and the third quantity.

In some examples of the method, apparatuses, and non-transitory computer-readable medium described herein, the rate-matching scheme may be determined based on the payload size of the UCI and the reference quantity of resource elements for the UCI.

Some examples of the method, apparatuses, and non-transitory computer-readable medium described herein may further include operations, features, means, or instructions for determining the payload size of the UCI may be below a threshold, encoding the UCI into a sequence of encoded bits using polar coding, and modulating symbols with the sequence of encoded bits based on the rate-matching scheme.

In some examples of the method, apparatuses, and non-transitory computer-readable medium described herein, the multiplexing may include operations, features, means, or instructions for mapping the modulated symbols to resource elements of the uplink shared channel.

In some examples of the method, apparatuses, and non-transitory computer-readable medium described herein, the quantity of resource elements for transmitting the UCI includes a first quantity of resource elements in the scheduled transmission of the uplink shared channel, a second quantity of resource elements in the first uplink transmission opportunity, a third quantity of resource elements in the second uplink transmission opportunity, or the lesser of the first quantity, the second quantity, and the third quantity.

In some examples of the method, apparatuses, and non-transitory computer-readable medium described herein, the uplink shared channel includes a PUSCH.

Some examples of the method, apparatuses, and non-transitory computer-readable medium described herein may further include operations, features, means, or instructions for receiving the uplink grant in DCI or via RRC signaling.

In some examples of the method, apparatuses, and non-transitory computer-readable medium described herein, the UCI includes an acknowledgment (ACK), a negative acknowledgment (NACK), a CSI, an aperiodic CSI (A-CSI), or a combination thereof.

In some examples of the method, apparatuses, and non-transitory computer-readable medium described herein, the A-CSI may be scheduled by a second uplink grant. In some examples of the method, apparatuses, and non-transitory computer-readable medium described herein, the uplink grant includes the second uplink grant.

Some examples of the method, apparatuses, and non-transitory computer-readable medium described herein may further include operations, features, means, or instructions for determining an uplink transmission opportunity overlaps with a PUCCH, where the PUCCH includes the UCI and the uplink transmission opportunity corresponds to at least one of the first uplink transmission opportunity or the second uplink transmission opportunity.

Some examples of the method, apparatuses, and non-transitory computer-readable medium described herein may further include operations, features, means, or instructions for multiplexing the ACK, the NACK, the CSI, or a combination thereof, on the uplink shared channel in the uplink transmission opportunity that overlaps with the PUCCH.

Some examples of the method, apparatuses, and non-transitory computer-readable medium described herein may further include operations, features, means, or instructions for determining that at least one uplink shared channel in the first uplink transmission opportunity or the second uplink transmission opportunity satisfies a resource constraint based on a quantity of resource elements in the uplink shared channel, where the resource constraint includes a quantity of resource elements for transmitting the UCI that is not greater than the quantity of resource elements in the uplink shared channel, and multiplexing the ACK, the NACK, the CSI, or a combination thereof, on the at least one uplink shared channel that satisfies the resource constraint.

In some examples of the method, apparatuses, and non-transitory computer-readable medium described herein, the quantity of resource elements in the uplink shared channel excludes a quantity of resource elements in one or more symbols that include a demodulation reference signal, a phase-tracking reference signal, or both Some examples of the method, apparatuses, and non-transitory computer-readable medium described herein may further include operations, features, means, or instructions for determining that each uplink shared channel in the first uplink transmission opportunity or the second uplink transmission opportunity satisfies a resource constraint based on a quantity of resource elements in the uplink shared channel, where the resource constraint includes a quantity of resource elements for transmitting the UCI that is not greater than the quantity of resource elements in the uplink shared channel, and multiplexing the ACK, the NACK, the CSI, or a combination thereof, on the at least one uplink shared channel that satisfies the resource constraint.

Some examples of the method, apparatuses, and non-transitory computer-readable medium described herein may further include operations, features, means, or instructions for multiplexing an A-CSI on the uplink shared channel in a selected transmission opportunity of the first uplink transmission opportunity or the second uplink transmission opportunity, where the UCI comprises the A-CSI.

In some examples of the method, apparatuses, and non-transitory computer-readable medium described herein, the selected uplink transmission opportunity may be a last uplink transmission opportunity that includes the first number of symbols allocated for the uplink shared channel, as identified based on the uplink grant.

In some examples of the method, apparatuses, and non-transitory computer-readable medium described herein, the selected uplink transmission opportunity may be a last uplink transmission opportunity identified based on the uplink grant, where the last uplink transmission opportunity includes either the first number of symbols allocated for the uplink shared channel or the second number of symbols different from the first number of symbols allocated for the uplink shared channel.

DETAILED DESCRIPTION

A user equipment (UE) in a wireless communication system may transmit the same data to a base station multiple times to increase reliability (e.g., to ensure the base station receives the information). For example, a UE may employ physical uplink shared channel (PUSCH) repetition, where the UE repeats transmission of the same data in the PUSCH several times. The repetitions may be scheduled or result from a UE breaking a scheduled transmission into multiple transmissions. Regardless of how repetitions arise, the UE may multiplex uplink control information (UCI) with the PUSCH. The UE may determine a rate-matching and coding scheme for multiplexing the UCI with each PUSCH transmission based on the actual payload size of the UCI (e.g., the number of resource elements used for transmitting the UCI) and the actual length (e.g., number of symbols) of that particular PUSCH transmission. This means that when the lengths of the PUSCH transmissions vary, the UE uses different coding schemes for different PUSCH transmissions. But discrepancies in coding schemes may adversely affect the ability of the base station to receive and combine the UCI in the multiple transmissions.

According to the techniques described herein, a UE may prevent changes in coding schemes between PUSCH transmissions of different lengths by multiplexing the UCI with the PUSCH in each transmission so as to maintain the same rate-matching and coding scheme across the multiple PUSCH transmissions, even if the lengths of the PUSCH transmissions vary. In one implementation, the UE may receive an uplink grant (e.g., in downlink control information (DCI) or via radio resource control (RRC) signaling) that schedules PUSCH repetitions of a first length (e.g., x symbols). The UE may then determine the actual lengths of the PUSCH transmissions, which may differ from each other and the scheduled length (e.g., due to conditions of the communication environment, such as the location of slot boundaries). The UE may also identify UCI to be multiplexed with the PUSCH (e.g., when the scheduled PUSCH overlaps with a physical uplink control channel (PUCCH) or based on an uplink grant for the UCI). The UE may multiplex the UCI with the PUSCH so as to maintain the same rate-matching scheme and the same coding scheme for each of the PUSCH repetitions, and transmit the UCI in at least one of the PUSCH transmissions.

Aspects of the disclosure are initially described in the context of one or more wireless communications systems. Aspects of the disclosure are also described in the context of systems and process flows that show the operations of one or more devices in one or more wireless communications systems. Aspects of the disclosure are further illustrated by and described with reference to apparatus diagrams, system diagrams, and flowcharts that relate to multiplexing uplink control information on uplink shared channel transmissions.

Figure 1:
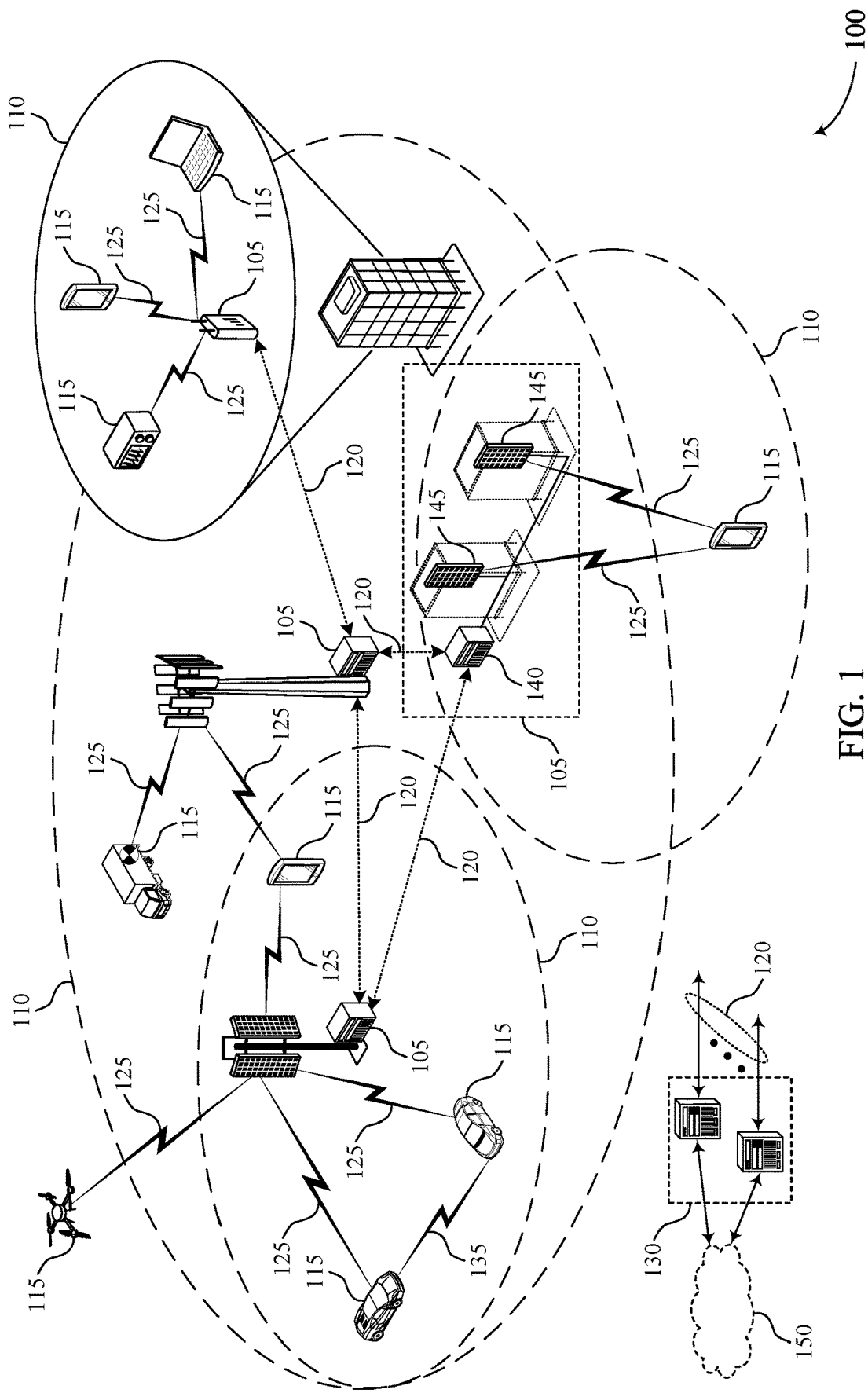
FIGS. 1 and 2 illustrate examples of a wireless communications system that supports multiplexing uplink control information on uplink shared channel transmissions in accordance with aspects of the present disclosure.

FIG. 1 illustrates an example of a wireless communications system 100 that supports multiplexing uplink control information on uplink shared channel transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some implementations, a UE 115 may use a repetition scheme in which the UE 115 sends the same data to a base station 105 multiple times. The repetition scheme may increase communication reliability by allowing the base station 105 to receive and combine multiple transmissions of the data (e.g., the base station 105 may perform join channel estimation across the multiple transmissions). In some examples, the repetition scheme may be a PUSCH repetition scheme where the UE 115 repeatedly transmits the same uplink data in the PUSCH. PUSCH repetitions may be scheduled by a base station 105 or result from a single scheduled PUSCH transmission being broken into multiple PUSCH transmissions. PUSCH repetitions may be scheduled by a base station 105 or result from a single scheduled PUSCH transmission being split into multiple PUSCH transmissions. In some cases, PUSCH repetitions may be scheduled on a mini-slot basis, as opposed to a slot-basis.

To initiate PUSCH repetitions, a base station 105 may send to the UE 115 an uplink grant (e.g., in DCI or via RRC signaling) that schedules the PUSCH repetitions and indicates repetition parameters. For example, the uplink grant may include a repetition factor, K, which indicates the number of times the UE 115 is to transmit the same data over the PUSCH. The uplink grant may also include a start and length indicator value (SLIV), which may indicate the symbol S when the PUSCH transmissions should start and the length L of each PUSCH transmission.

Upon receiving the uplink grant, a UE 115 may determine a transmission opportunity for each scheduled PUSCH transmission. The UE 115 may also determine the length of each PUSCH transmission (e.g., based on the respective transmission opportunity). The UE 115 may additionally identify UCI to be multiplexed with the PUSCH. In some examples, the UE 115 may identify the UCI based on a PUCCH that overlaps with the scheduled PUSCH transmission, or based on a scheduling grant for the UCI. In certain systems, the UE 115 may determine a rate-matching scheme and a coding scheme for multiplexing the UCI with each PUSCH transmission based on a payload size of the UCI and a length of the PUSCH transmission. The UE 115 may determine a number of resource elements for transmitting the UCI in the PUSCH. The "length" or "actual length" of a PUSCH transmission may refer to the number of symbols over which PUSCH data is transmitted, which may correspond to the number of symbols making up the transmission opportunity. Similarly, the "actual number of resource elements" may refer to the number of resource elements the UCI will use in the PUSCH. But using the actual length of PUSCH transmissions and the actual number of resource elements to determine the rate-matching scheme and the coding scheme may negatively impact the ability of the base station 105 to combine and receive the UCI in the PUSCH transmissions. For example, when PUSCH transmissions vary in length, the UE 115 may use different coding schemes for different PUSCH transmissions, which may make it more difficult for a base station 105 to receive the UCI by combining the UCI from the multiple PUSCH transmissions.

To solve this problem, a UE 115 may multiplex the UCI with the PUSCH in each transmission so as to maintain the same rate-matching and coding scheme across the multiple PUSCH transmissions, regardless of the actual length of the PUSCH transmissions. To do so, the UE 115 may multiplex the UCI with the PUSCH in at least one transmission based on a reference number of resource elements. The reference number of resource elements may be determined based on the PUSCH length provided by the uplink grant, rather than the actual length of the PUSCH transmissions. Although described with reference to PUSCH repetition, the techniques described herein can be implemented in any type of repetition scheme. Unless context provides otherwise, the terms transmission and repetition may be used interchangeably herein. The wireless communications system 100 may therefore include features for improved power savings and, in some examples, may promote improved UCI transmission efficiencies, among other benefits.

Figure 2:
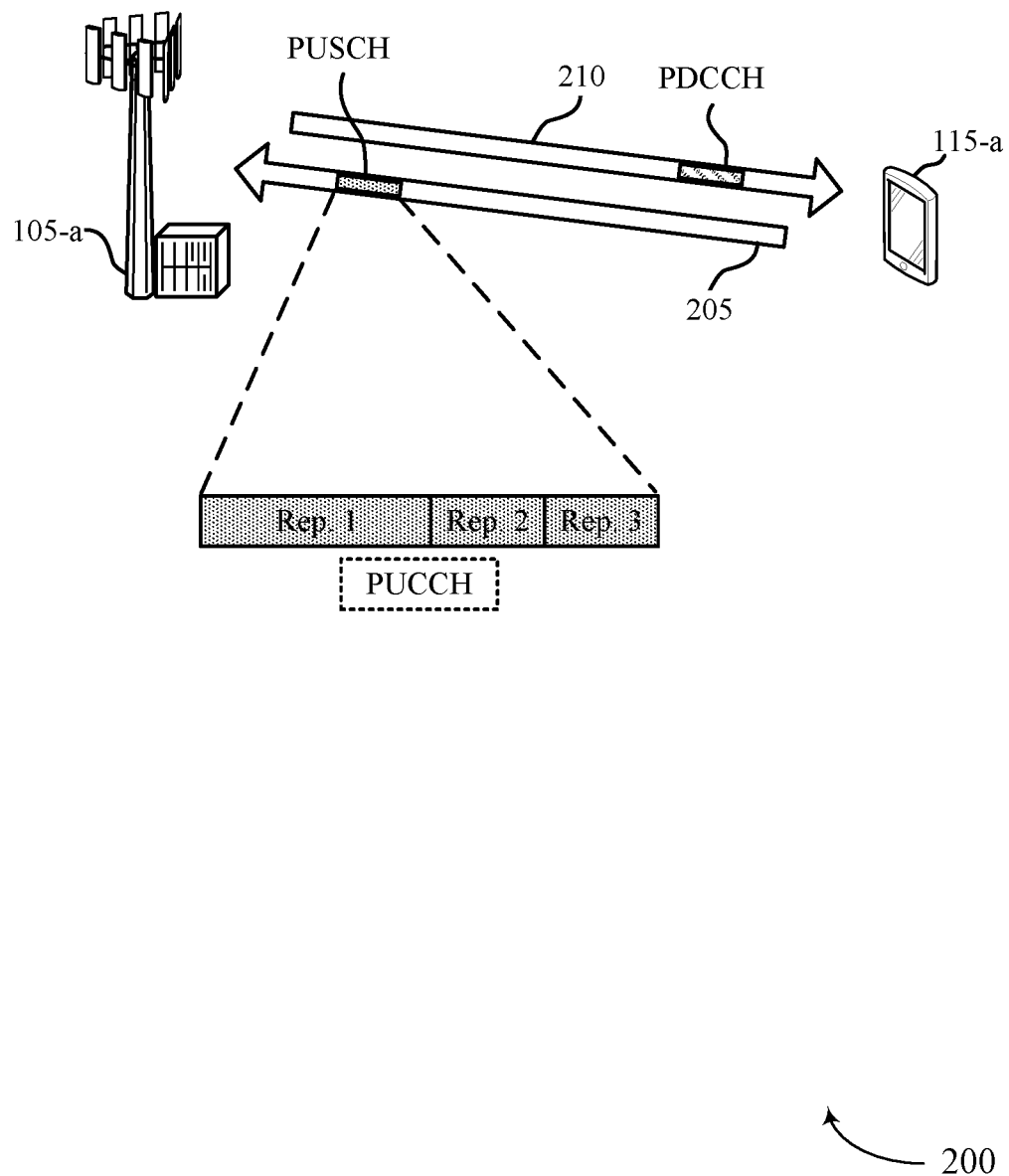

FIG. 2 illustrates an example of a wireless communications system 200 that supports multiplexing uplink control information on uplink shared channel transmissions in accordance with aspects of the present disclosure. In some examples, wireless communications system 200 may implement aspects of wireless communication system 100. In the illustrated example, the system 200 may include a UE 115-a and a base station 105-a. The UE 115-a may be an example of a UE 115 described with reference to FIG. 1 and the base station 105-a may be an example of a base station 105 described with reference to FIG. 1.

The base station 105-a and the UE 115-a may communicate with each other via an uplink 205 and a downlink 210. For instance, the UE 115-a may send uplink data and control information to the base station 105-a in various channels of the uplink 205, and the base station 105-a may send downlink data and control information to the UE 115-a in various channels of the downlink 210. In one example, an uplink grant may be conveyed in a physical downlink control channel (PDCCH). The uplink grant may schedule one or more PUSCH transmissions by the UE 115-a. For example, the uplink grant may schedule two PUSCH transmissions (K=2) each of length x (L=x).

Upon receiving the PUSCH scheduling information, the UE 115-a may identify a transmission opportunity for each repetition of the PUSCH. But due to system constraints, the length of a transmission opportunity may be less than the scheduled length x. This may occur, for example, when a PUSCH transmission is scheduled across a slot boundary and the UE 115-a splits the PUSCH transmission into two transmissions. In such a scenario, the UE 115-a may transmit three PUSCH repetitions (e.g., repetition 1, repetition 2, and repetition 3), even though only two transmissions were scheduled, and the lengths of the repetitions may vary (e.g., the lengths of repetition 2 and repetition 3 may be less than the length of repetition 1). Thus, when the length of a transmission opportunity decreases, the length of an associated PUSCH repetition may also decrease. However, the UE may compensate for the reduced length by increasing the amount of information carried by a resource (e.g., the UE may increase the bits per resource element (BPRE) for a shortened PUSCH transmission). A transmission opportunity may also be referred to herein as a transmission occasion.

The UE 115-a may identify UCI to be multiplexed with the PUSCH. In some cases, the base station 105-a may schedule a PUSCH transmission that overlaps in time with a PUCCH transmission, and the UE 115-a may identify UCI in the PUCCH to be multiplexed with the PUCCH, such as an acknowledgment (ACK), a negative acknowledgment (NACK), a channel state information (CSI), or a combination thereof. Additionally or alternatively, the base station 105 may schedule the UCI (e.g., an aperiodic CSI (A-CSI)) by an uplink grant, for example in the PDCCH. In some examples, the UE 115-a may perform a CSI calculation based on the uplink grant. In some examples, the UE 115-a may generate an A-CSI report based on the CSI calculation. The UE 115-a may determine to multiplex the UCI with the PUSCH in at least one PUSCH repetition.

The UE 115-a may determine the number of resource elements of the PUSCH to allocate for transmitting the UCI in each PUSCH repetitions based on the length of the PUSCH repetition and a payload size of the UCI. For example, when the UCI includes an ACK or a NACK and the PUSCH is scheduled with uplink shared data, the number of allocated resource elements $Q'_{ACK}$ may be calculated using the formula:

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right. \quad (1)$$
$$\left. \left\lceil \alpha \cdot \sum_{l=l_0}^{N_{symb,all}^{PUSCH}-1} M_{sc}^{UCI}(l) \right\rceil \right\},$$

where ($O_{ACK}$+$L_{ACK}$) is the payload size of the ACK or the NACK, $\beta_{offset}^{PUSCH}$ may be a modulation and coding scheme (MCS) offset for bits of the PUSCH, $$\sum_{l=0}^{N_{symb,all}^{PUSCH}-1} M_{sc}^{UCI}(l)$$

is the number of resource elements in the PUSCH available for transmitting the UCI, and $\sum_{r=0}^{C_{UL-SCH}-1} K_r$ is the payload size of the uplink shared data. In another example, when the PUSCH is scheduled without shared data, the number of allocated resource elements $Q'_{ACK}$ may be calculated using the formula:

$$Q'_{ACK} = \min\left\{\left\lceil\frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{R \cdot Q_m}\right\rceil,\right. \quad (2)$$

$$\left.\left\lceil\alpha \cdot \sum_{l=l_0}^{N_{symb,all}^{PUSCH}-1} M_{sc}^{UCI}(l)\right\rceil\right\},$$

where $Q_m$ is the modulation order and R is the coding rate. The UE 115-$a$ may similarly calculate a number of allocated resource elements using formulas when the UCI includes a CSI, A-CSI, CSI part 1, CSI part 2, etc.

The UE 115-$a$ may determine a rate-matching scheme for a PUSCH transmission based on the number of resource elements allocated to the UCI. The UCI may include K information bits, which may include bits of an attached CRC. The UE 115-$a$ may use polar coding to encode the K information bits to an output of a polar mother code, where the output may have a length (e.g., a coded bit length) of $N=2^n$. The UE 115-$a$ may use the rate-matching scheme to map the output of length N to a length M, where the length M may not be a power of 2. The length N may be based on K, the coding rate R, the length M, or a combination thereof.

Before performing the rate-matching, the UE 115-$a$ may pass the polar mother code to a circular buffer of length N. The rate-matching scheme may include a puncturing scheme, a shortening scheme, or a repetition scheme. The UE 115-$a$ may use the puncturing scheme or the shortening scheme when N is greater than M, and the UE 115-$a$ may use the repetition scheme when N is less than M. The puncturing scheme may include selecting the bits from the positions (N−M) to (N−1) of the circular buffer. The shortening scheme may include selecting the bits from the positions 0 to (M−1) of the circular buffer. The repetition scheme may include selecting all the bits from the circular buffer, and additionally repeating (M−N) consecutive bits of the circular buffer, starting from the smallest index bit. The UE 115-$a$ may determine which rate-matching scheme to use based on the payload size of the UCI (e.g., K) and an output sequence length, where the output sequence length may refer to a desired number of coded bits (e.g., M) based on the number of resource elements allocated for transmitting the UCI. For example, the UE 115-$a$ may determine to use the shortening scheme if the ratio KIM is above a threshold (e.g., 7/16), or use the puncturing scheme otherwise.

In summary, the number of resource elements allocated to the UCI in the PUSCH may vary with the number of symbols in the associated PUSCH transmission occasion. The rate-matching and coding scheme for the PUSCH transmission may be determined based on the number of resource elements allocated to the UCI. This means that when the length of PUSCH transmission occasions vary, the rate-matching and coding scheme used in multiplexing the UCI with the PUSCH data during the occasions also varies. For example, the rate-matching and coding scheme used for PUSCH repetition 1 may be different than the rate-matching and coding scheme used for PUSCH repetition 2 or PUSCH repetition 3. Thus, the rate-matching and coding scheme used for the PUSCH repetitions may vary with their length. But such variance between the PUSCH repetitions may inhibit receiving and combining the UCI at the base station 105-$a$.

The UE 115-$a$ may prevent rate-matching scheme and coding scheme differences between PUSCH repetitions by multiplexing the UCI so as to maintain the same rate-matching and coding scheme for each repetition, regardless of the length of the associated transmission opportunity. The UE 115-$a$ may determine the coding scheme using the length of the PUSCH transmission provided by the uplink grant, rather than the length of an actual PUSCH transmission. Additionally, the UE 115-$a$ may determine a number of resource elements $Q_{UCI}$ for transmitting the UCI (e.g., an "actual number" of resource elements), as well as a reference number of resource elements $Q_{ref}Q_{UCI}$ for a given PUSCH repetition may be determined based on the quantity of resource elements in the PUSCH repetition, or the quantity of resource elements in the PUSCH repetition indicated in the uplink grant, or the minimum available quantity of resource elements across all PUSCH repetitions (e.g., repetition 1, repetition 2, and repetition 3). $Q_{ref}$ may be the same for all PUSCH repetitions (e.g., repetition 1, repetition 2, and repetition 3) and may be determined based on the quantity of resource elements in the PUSCH repetition indicated in the uplink grant, the minimum available quantity of resource elements across all PUSCH repetitions, or the maximum available quantity of resource elements across all PUSCH repetitions. The UE may determine the quantity of resource elements in the PUSCH repetition indicated in the uplink grant based on a reference signal configuration associated with the length L. A reference signal configuration may refer to a number of resources (symbols or resource elements) in the PUSCH allocated for reference signals, such as a demodulation reference signal (DMRS) or a phase-tracking reference signal (PTRS). Each scheduled length L may have an associated reference signal configuration. For example, a scheduled length L=8 may indicate that a PUSCH transmission should include one reference signal and seven data symbols.

After determining $Q_{UCI}$, the UE 115-$a$ may perform channel coding for the UCI, for example based on a payload size of the UCI. In some examples, if the payload size of the UCI is below a threshold (e.g., eleven bits), the UE 115-$a$ may encode the UCI into a sequence of $Q_{UCI}$ encoded bits. The UE 115-$a$ may then modulate symbols with the sequence of encoded bits and map the modulated symbols to resource elements in at least one PUSCH repetition. In some examples, if the payload size of the UCI is below the threshold, the base station 105-$a$ may be able to soft-combine the UCI received in the PUSCH repetitions despite differences in the lengths of encoded bits.

In some examples, if the payload size of the UCI is above the threshold, the UE 115-$a$ may determine $Q_{ref}$ as described herein. The UE 115-$a$ may use $Q_{ref}$ to determine a rate-matching output sequence length $E_{ref}$, where $E_{ref}=N_L \cdot Q_{ref} \cdot Q_m$, $N_L$ represents a number of layers in the PUSCH transmission, and $Q_m$ is the modulation order. The UE 115-$a$ may then encode the UCI into a sequence of $E_{ref}$ coded bits $b_0, b_1, \ldots, b_{E_{ref}-1}$. The UE 115-$a$ may determine an actual number of coded bits $E_{UCI}$, where $E_{UCI}=N_L \cdot Q_{UCI} \cdot Q_m$, and generate the $E_{UCI}$ bits of the coded UCI from the sequence of coded bits $b_0, b_1, \ldots, b_{E_{ref}-1}$. The $E_{UCI}$ bits may be expressed as $c_j=b_{j \bmod E_{ref}}$. In some examples, if $E_{UCI}$ is greater than $E_{ref}$, the sequence of $E_{ref}$ coded bits $b_0, b_1, \ldots, b_{E_{ref}-1}$ may be cyclically extended.

The UE 115-$a$ may determine which rate-matching scheme to use based on the output sequence length $E_{ref}$, which is the same across all PUSCH repetitions. This may enable the UE 115-$a$ to use the same rate-matching and coding scheme for the UCI in each PUSCH repetition. Based on the rate-matching and coding scheme, the base station 105-$a$ may soft-combine the UCI received over the PUSCH repetitions.

Figure 3:
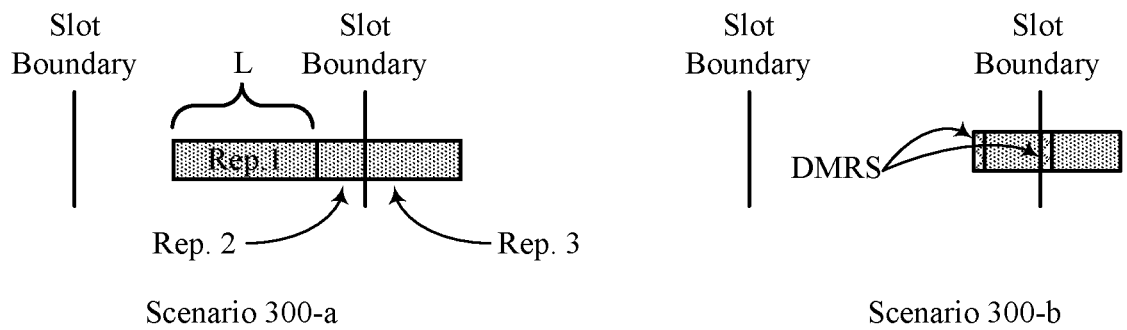
FIG. 3 illustrates examples of communication scenarios that support multiplexing uplink control information on uplink shared channel transmissions in accordance with aspects of the present disclosure.
Figure 3:
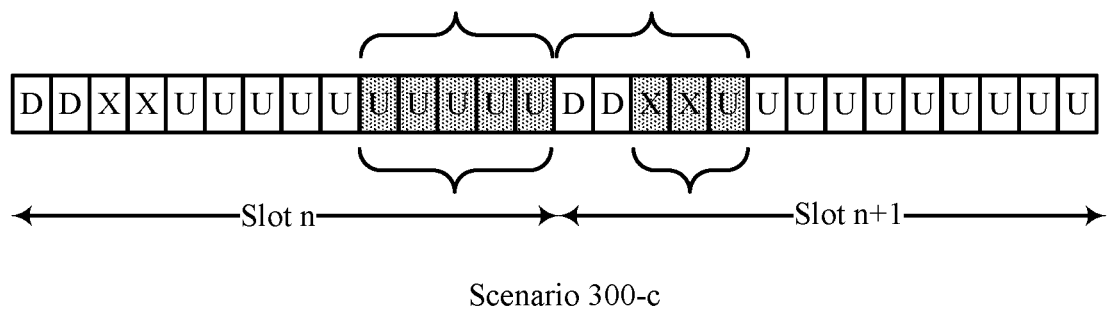
Figure 3:
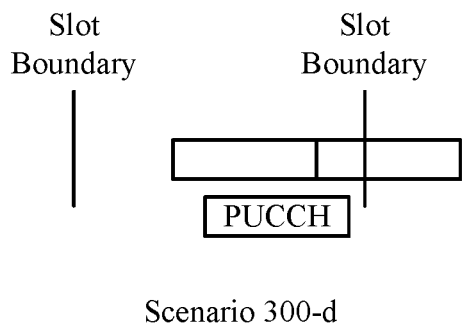

FIG. 3 illustrates examples of communication scenarios 300 that support multiplexing uplink control information on uplink shared channel transmissions in accordance with aspects of the present disclosure. In some examples, communication scenarios 300 may implement aspects of wireless communication system 100 and wireless communications system 200. Communication scenarios 300 may be examples of scenarios that occur when a base station 105 schedules a UE 115 to transmit data over the PUSCH (e.g., on a mini-slot basis). Communication scenarios 300-a, 300-b, and 300-c may illustrate PUSCH repetitions with various lengths, and communication scenario 300-d may illustrate a conflict between PUSCH and PUCCH.

In scenario 300-a, a UE may be scheduled by a base station to send two PUSCH repetitions of length L to the base station. But after receiving the scheduling information, the UE may determine that the second PUSCH repetition crosses a slot boundary. Because a base station may expect certain signals (e.g., reference signals) at the beginning of a slot, transmitting a repetition across a slot boundary may hinder reception at the base station. Accordingly, the UE may convert (e.g., split) the PUSCH repetition into two repetitions so that one repetition (e.g., repetition 2) occurs before the slot boundary and the other repetition (e.g., repetition 3) occurs after the slot boundary. Thus, in scenario 300-a, the UE may send three repetitions of PUSCH data instead of two, and the repetitions may have varying lengths.

The UE may identify UCI that is to be multiplexed with the PUSCH, for example based on a scheduling grant from the base station. Rather than determine a separate rate-matching and coding scheme for multiplexing the UCI with each repetition based on the actual length of the repetition, which may lead to reception and combination complications at the base station, the UE may multiplex the UCI for each repetition so as to maintain the same rate-matching and coding scheme across the PUSCH repetitions, regardless of the actual length of the PUSCH repetitions. To do so, the UE may multiplex the UCI with the PUSCH based on a reference number of resource elements. The reference number of resource elements may be determined based on the length of a nominal repetitions, rather than the actual length of the PUSCH repetitions. A nominal repetition may be a repetition whose length (e.g., number of symbols) is equal to the length L provided by the base station (e.g., indicated in the SLIV). Thus, the UE may multiplex the UCI with the PUSCH using the length of the nominal repetition (e.g., repetition 1) and use the same rate-matching and coding scheme for each repetition regardless of its actual length. In some examples, the UE may determine to multiplex the UCI with PUSCH repetitions whose length is the length of the nominal repetitions (e.g., repetition 1), while not multiplexing the UCI with PUSCH repetitions with lengths other than the length of the nominal repetitions (e.g., repetitions 2 and 3).

In some examples, the UE may perform a CSI calculation based on the scheduling grant. The UE may generate an A-CSI report based on the CSI calculation. and determine to include the generated A-CSI report in the UCI in one or more repetitions. For example, the UE may determine to include the A-CSI in one or more later repetitions to enable the UE to meet a timeline for the CSI calculation. In some examples, the UE may determine to include the A-CSI in a last nominal repetition (i.e., a repetition that includes a number of symbols equal to the length L). Additionally or alternatively, the UE may determine to include the A-CSI in a last repetition of the scheduled repetitions, where the last repetition may be a nominal repetition or include a number of symbols different from the length L.

In scenario 300-b, a UE may be scheduled by a base station to send one PUSCH transmission of length L to the base station. For example, the UE may be scheduled to send a PUSCH transmission that has a length of eight symbols (e.g., one leading DMRS symbol followed by seven data symbols). But the UE may determine that the scheduled PUSCH transmission crosses a slot boundary. Accordingly, the UE may convert the PUSCH transmission into two PUSCH transmissions, repetition 1 and repetition 2, each of which starts with a DMRS and each of which includes three symbols for PUSCH data. Thus, rather than sending a nominal repetition of eight symbols, the UE may send two repetitions of four symbols.

When multiplexing UCI with the PUSCH, the UE may multiplex the UCI with the PUSCH using the length of the virtual nominal repetition. This means that the UE may determine the rate-matching scheme and the coding scheme based on the virtual nominal repetition, including the DMRS and PTRS configurations associated with the nominal repetition. Thus, the UE may multiplex the UCI with the PUSCH in each repetition based on the length L provided by the base station even though the UE does not transmit any repetitions of that length. In some examples, when the UE does not transmit repetitions with the nominal length, the UE may declare an error associated with transmitting the UCI.

In scenario 300-c, a UE may be operating in a TDD system that includes uplink symbols, denoted U, and downlink symbols, denoted D. The TDD system may also include special symbols, denoted X, for switching between downlink and uplink. In scenario 300-c, the UE may be scheduled by a base station to send two PUSCH repetitions of length L to the base station. For example, the UE may be scheduled to send two PUSCH repetitions that each have a length of five symbols. The first PUSCH repetition may be scheduled during slot n, and the second PUSCH repetition may be scheduled during slot n+1. But the UE may determine that one of the scheduled PUSCH transmissions coincides with a downlink transmission. For example, the UE may determine that a portion of the second repetition, repetition 2, is scheduled during one or more symbols allocated for downlink data. Accordingly, the UE may shorten the length of the second repetition (e.g., to a number of symbols equal to L minus the number of downlink symbols). According to the techniques described herein, the UE may multiplex UCI with the PUSCH in at least one repetition based on the length L of the nominal repetition so as to maintain the same rate-matching and coding scheme across the multiple PUSCH transmissions, regardless of the actual length of the PUSCH transmissions.

In scenario 300-d, a UE may be scheduled by a base station to transmit a PUCCH during one or more PUSCH transmissions. The UE may determine to multiplex UCI in the PUCCH with the PUSCH in one or more PUSCH repetitions. The UE may multiplex the UCI with the PUSCH in each transmission so as to maintain the same rate-matching and coding scheme across the multiple PUSCH transmissions, regardless of the actual length of the PUSCH transmissions. To do so, the UE may multiplex the UCI with the PUSCH in one or more transmissions based on a reference number of resource elements, rather than the number of resource elements used for transmitting the UCI. The reference number of resource elements may be determined based on the PUSCH length provided by the uplink grant, rather than the actual length of the PUSCH transmissions. In some examples, the UE may determine all repetitions that overlap with the PUCCH include a number of symbols different from the length L, and declare an error associated with the UCI.

In some examples, the determined number of symbols (e.g., a quantity of resource elements) in a repetition may exclude symbols used for reference signals (e.g., DMRS, PTRS, etc.). In some examples, the UE may not expect that a number of the modulated symbols with the coded bits is greater than the number of symbols in each repetition that overlaps with the PUCCH. Additionally or alternatively, the UE may not expect that a number of the modulated symbols with the coded bits is greater than the number of symbols in any repetition that overlaps with the PUCCH. In some examples, the UE may determine all repetitions that overlap with the PUCCH include a number of symbols less than the number of the modulated symbols, and declare an error associated with the UCI. Additionally or alternatively, the UE may determine at least one repetition that overlaps with the PUCCH includes a number of symbols less than the number of the modulated symbols, and declare an error associated with the UCI.

Figure 4:
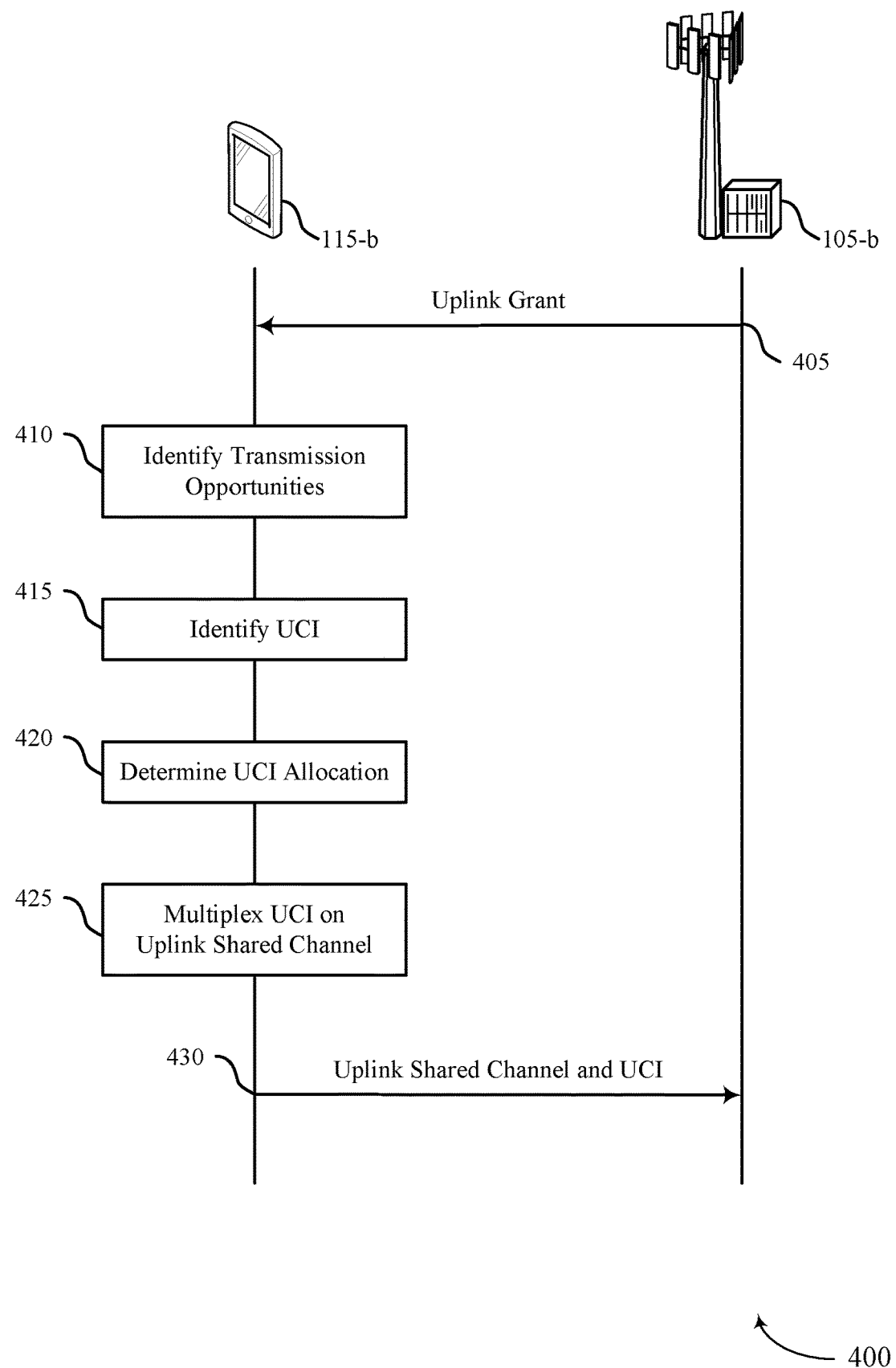
FIG. 4 illustrates an example of a process flow that supports multiplexing uplink control information on uplink shared channel transmissions in accordance with aspects of the present disclosure.

FIG. 4 illustrates an example of a process flow 400 that supports multiplexing uplink control information on uplink shared channel transmissions in accordance with aspects of the present disclosure. In some examples, process flow 400 may implement aspects of wireless communication system 100 and wireless communications system 200. For example, the process flow 400 may include a base station 105-b and a UE 115-b, which may be examples of the corresponding devices described with reference to FIGS. 1 and 2. In the following description of the process flow 400, the operations between the base station 105-b and the UE 115-b may be transmitted in a different order than the example order shown, or the operations performed by the base station 105-b and the UE 115-b may be performed in different orders or at different times. Some operations may also be omitted from the process flow 400, and other operations may be added to the process flow 400. The operations performed by the base station 105-b and the UE 115-b may support improvement to the UE 115-b PUSCH transmission operations and, in some examples, may promote improvements to the UE 115-b reliability, among other benefits.

At 405, the UE 115-b may receive an uplink grant scheduling an uplink shared channel (e.g., a PUSCH) transmission. In some examples, the uplink grant may be a dynamic grant in DCI. In some examples, the uplink grant may be a configured grant indicated via RRC signaling. In some examples, the uplink grant may include a repetition factor, K, which indicates a number of repetitions of the uplink shared channel transmission the UE 115-b is to make. The uplink grant may also include a SLIV, which may indicate the symbol S when the uplink shared channel transmissions should start and the length L (e.g., the number of symbols) of each transmission. In some examples, the UE 115-b may receive a second uplink grant scheduling UCI (e.g., an A-CSI). In some examples, the UE 115-b may receive the uplink grant in a PDCCH. In some examples, the UE 115-b may identify the uplink shared channel includes a URLLC transmission based on the uplink grant.

At 410, the UE 115-b may identify transmission opportunities in which to transmit the uplink shared channel repetitions. The UE 115-b may determine that at least one of the scheduled repetitions crosses a slot boundary. Because the base station 105-b may expect certain signals (e.g., reference signals) at the beginning of a slot, transmitting a repetition across a slot boundary may hinder reception at the base station 105-b. Accordingly, the UE 115-b may convert (e.g., split) the repetition into two repetitions so that one repetition occurs before the slot boundary and the other repetition occurs after the slot boundary. In some examples, the UE 115-b may determine that one of the scheduled repetitions coincides with a downlink transmission. For example, the UE 115-b may determine that a portion of a repetition is scheduled during one or more symbols allocated for downlink data. Accordingly, the UE 115-b may shorten the length of the repetition that coincides with the downlink transmission (e.g., to a number of symbols equal to L minus the number of downlink symbols). Based on the splitting, the UE 115-b may identify that at least one repetition include a number of symbols different from the length L.

At 415, the UE 115-b may identify UCI to be multiplexed on the uplink shared channel. In some examples, the UCI may be included in a PUCCH that overlaps with one of the repetitions. In some examples, the UE 115-b may identify the UCI based on the uplink grant. For example, the uplink grant may include an indication that triggers A-CSI report transmission on the uplink shared channel. In some examples, the UCI may include an ACK, a NACK, a CSI, an A-CSI, etc. In some examples, the UE 115-b may determine the UCI comprises a first portion (e.g., CSI part 1) and a second portion (e.g., CSI part 2). In some examples, the UE 115-b may perform a CSI calculation based on the uplink grant. In some examples, the UE 115-b may generate an A-CSI report based on the CSI calculation.

At 420, the UE 115-b may determine an allocation for the UCI in each repetition so as to maintain a same rate-matching scheme and a same coding scheme for each of the repetitions. The number of resource elements allocated to the UCI in each repetition may vary with the number of symbols in the repetition. For example, the UE 115-b may allocate a first quantity of resource elements to a first repetition, and a second quantity of resource elements different from the first quantity to a second repetition based on the rate-matching scheme and the coding scheme. In some examples, the UE 115-b may determine the coding scheme using the length of the uplink shared channel transmission provided by the uplink grant, rather than the length of an actual repetition. Additionally, the UE 115-b may determine a number of resource elements (e.g., $Q_{UCI}$) for transmitting the UCI, as well as a reference number of resource elements (e.g., $Q_{ref}$). $Q_{UCI}$ for a given repetition may be determined based on the quantity of resource elements in the repetition, or the quantity of resource elements in the uplink shared channel transmission indicated in the uplink grant, or the minimum available quantity of resource elements across all repetitions. $Q_{ref}$ may be the same for all repetitions and may be determined based on the quantity of resource elements in the uplink shared channel transmission indicated in the uplink grant, the minimum available quantity of resource elements across all repetitions, or the maximum available quantity of resource elements across all repetitions. In some examples, the rate-matching scheme may be determined based on the payload size of the UCI and the reference number of resource elements $Q_{ref}$.

The UE 115-b may not expect the determined $Q_{UCI}$ to be greater than the number of resource elements allocated to the UCI in any repetition. The determined number of symbols (e.g., a quantity of resource elements) in a repetition available for UCI transmission may exclude resource elements used for reference signals (e.g., all resource elements in a DMRS OFDM symbol, resource elements that contain a PTRS, etc.). In some examples, the determined number of symbols available for UCI transmission may be represented by $$\sum_{l=l_0}^{N_{symb,all}^{PUSCH}-1} M_{sc}^{UCI}(l),$$

as described with reference to FIG. 2.

In some examples, the UE 115-b may determine to include the generated A-CSI report in the UCI in one or more repetitions. For example, the UE 115-b may determine to include the A-CSI in one or more later repetitions to enable the UE 115-b to meet a timeline for the CSI calculation. In some examples, the UE 115-b may determine to include the A-CSI only in a last nominal repetition (i.e., a repetition that includes a number of symbols equal to the length L). Additionally or alternatively, the UE 115-b may determine to include the A-CSI in a last repetition of the scheduled repetitions, where the last repetition may be a nominal repetition or include a number of symbols (e.g., OFDM symbols) different from the length L. The UE 115-b may determine $Q_{UCI}$ for the one or more repetitions that include the A-CSI (e.g., the last repetition, the last nominal repetition, etc.). In some examples, when the last repetition includes a number of symbols (e.g., OFDM symbols) different from the length L, the UE 115-b may not expect that a determined $Q_{UCI}$ for the last repetition to be greater than the number of resource elements allocated to the UCI in the last repetition.

After determining $Q_{UCI}$, the UE 115-b may perform channel coding for the UCI, for example based on a payload size of the UCI. In some examples, if the payload size of the UCI is below a threshold (e.g., eleven bits), the UE 115-b may encode the UCI into a sequence of encoded bits.

In some examples, if the payload size of the UCI is above the threshold, the UE 115-b may determine $Q_{ref}$ as described herein. The UE 115-b may use $Q_{ref}$ to determine a rate-matching output sequence length. The UE 115-b may then encode the UCI into a sequence of coded bits corresponding to the output sequence length. The UE 115-b may determine a quantity of coded bits, and generate the quantity of coded bits of the UCI from the sequence of coded bits. In some examples, the UE 115-b may determine the quantity of coded bits is greater than the output sequence length, and cyclically extend the sequence of coded bits.

At 425, the UE 115-b may multiplex the UCI on the uplink shared channel in one or more repetitions based on the UCI allocation. In some examples, the UE 115-b may modulate symbols with the coded bits and map the modulated symbols to resource elements in the repetitions. In some examples, the UE 115-b may multiplex the first portion of the UCI with the URLLC transmission. In some examples, the UE 115-b may determine that each repetition includes a number of symbols different from the length L, and declare an error associated with the UCI. In some examples, the UE 115-b may multiplex the ACK, the NACK, the CSI, or a combination thereof, from the PUCCH on the uplink shared channel in the repetition that overlaps with the PUCCH. In some examples, the UE 115-b may determine all repetitions that overlap with the PUCCH include a number of symbols different from the length L, and declare an error associated with the UCI.

In some examples, the determined number of symbols (e.g., a quantity of resource elements) in a repetition may exclude symbols used for reference signals (e.g., DMRS, PTRS, etc.). The UE 115-b may not expect that a number of the modulated symbols with the coded bits is greater than the number of symbols in each repetition that overlaps with the PUCCH. In some examples, the UE 115-b may determine all repetitions that overlap with the PUCCH include a number of symbols less than the number of the modulated symbols, and declare an error associated with the UCI.

At 430, the UE 115-b may transmit the uplink shared channel and the UCI in each of the repetitions. The operations performed by the base station 105-b and the UE 115-b may therefore support improvements to the UE 115-b UCI transmission operations and, in some examples, may promote improvements to the UE 115-b reliability, among other benefits.

Figure 5:
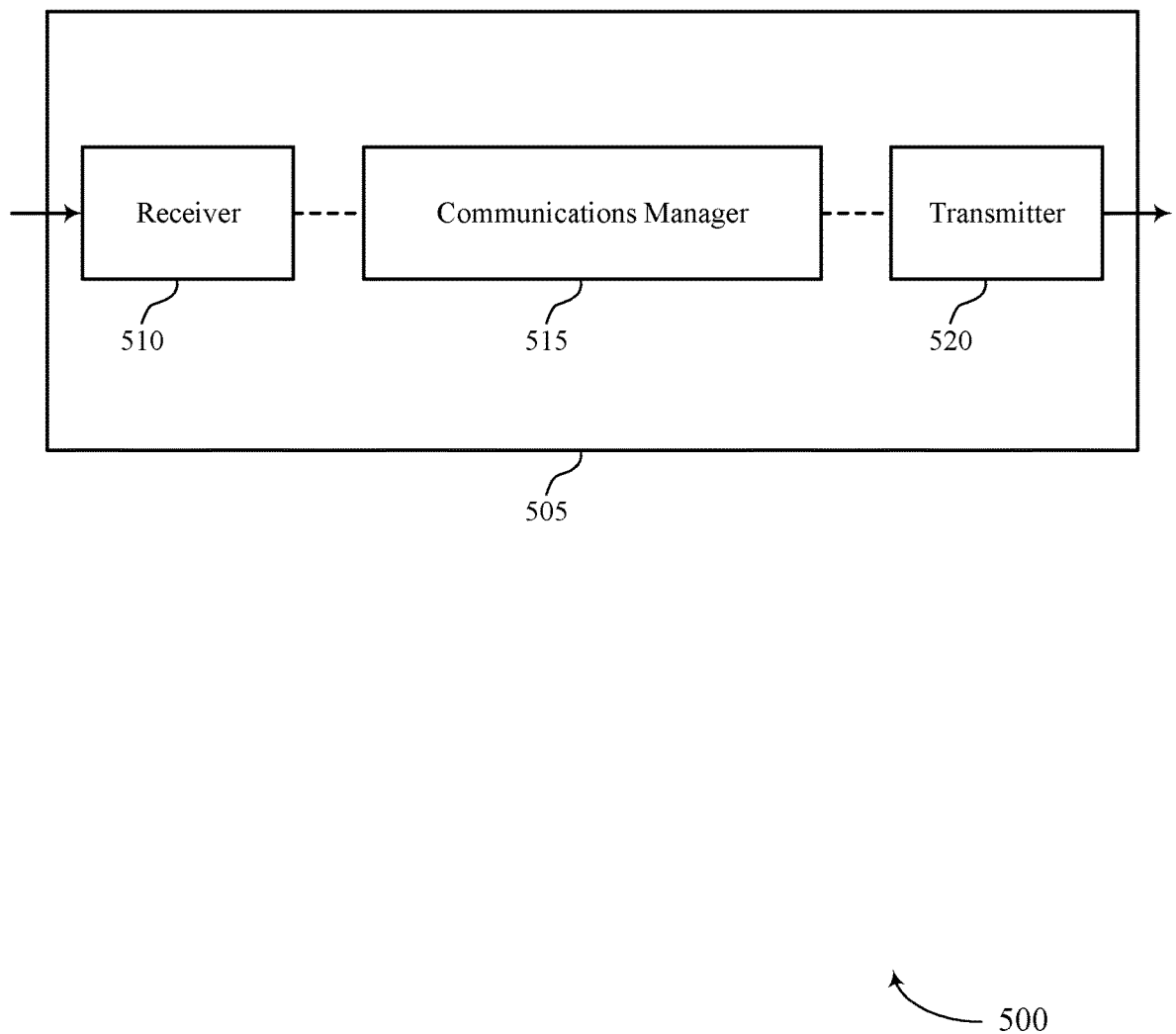
FIGS. 5 and 6 show block diagrams of devices that support multiplexing uplink control information on uplink shared channel transmissions in accordance with aspects of the present disclosure.

FIG. 5 shows a block diagram 500 of a device 505 that supports multiplexing uplink control information on uplink shared channel transmissions in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to multiplexing uplink control information on uplink shared channel transmissions, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive an uplink grant that schedules a transmission of an uplink shared channel using a first number of symbols, identify, based on the uplink grant, at least a first uplink transmission opportunity and a second uplink transmission opportunity during which the uplink shared channel is to be transmitted, where at least one of the first uplink transmission opportunity or the second uplink transmission opportunity includes a second number of symbols different from the first number of symbols allocated for the uplink shared channel, identify UCI to be multiplexed on the uplink shared channel during at least one of the first uplink transmission opportunity and the second uplink transmission opportunity, and multiplex the UCI on the uplink shared channel so as to maintain a same rate-matching scheme and a same coding scheme for each of the first uplink transmission opportunity and the second uplink transmission opportunity, and transmit the uplink shared channel and the UCI during the at least one of the first uplink transmission opportunity and the second uplink transmission opportunity.

The communications manager 515 as described herein may be implemented to realize one or more potential advantages. One implementation may allow the device 505 to save power and increase battery life by communicating with a base station 105 (as shown in FIG. 1) more efficiently. For example, the device 505 may efficiently transmit UCI to a base station 105 in uplink shared channel transmissions, as the device 505 may be able to reconfigure UCI transmission processes and multiplex the UCI on the uplink shared channel transmissions to successfully transmit the UL message while maintaining a same rate-matching and a same coding scheme across the uplink shared channel transmissions. Another implementation may promote low latency communications at the device 505, as a number of resources allocated to signaling overhead and UCI transmission may be reduced. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
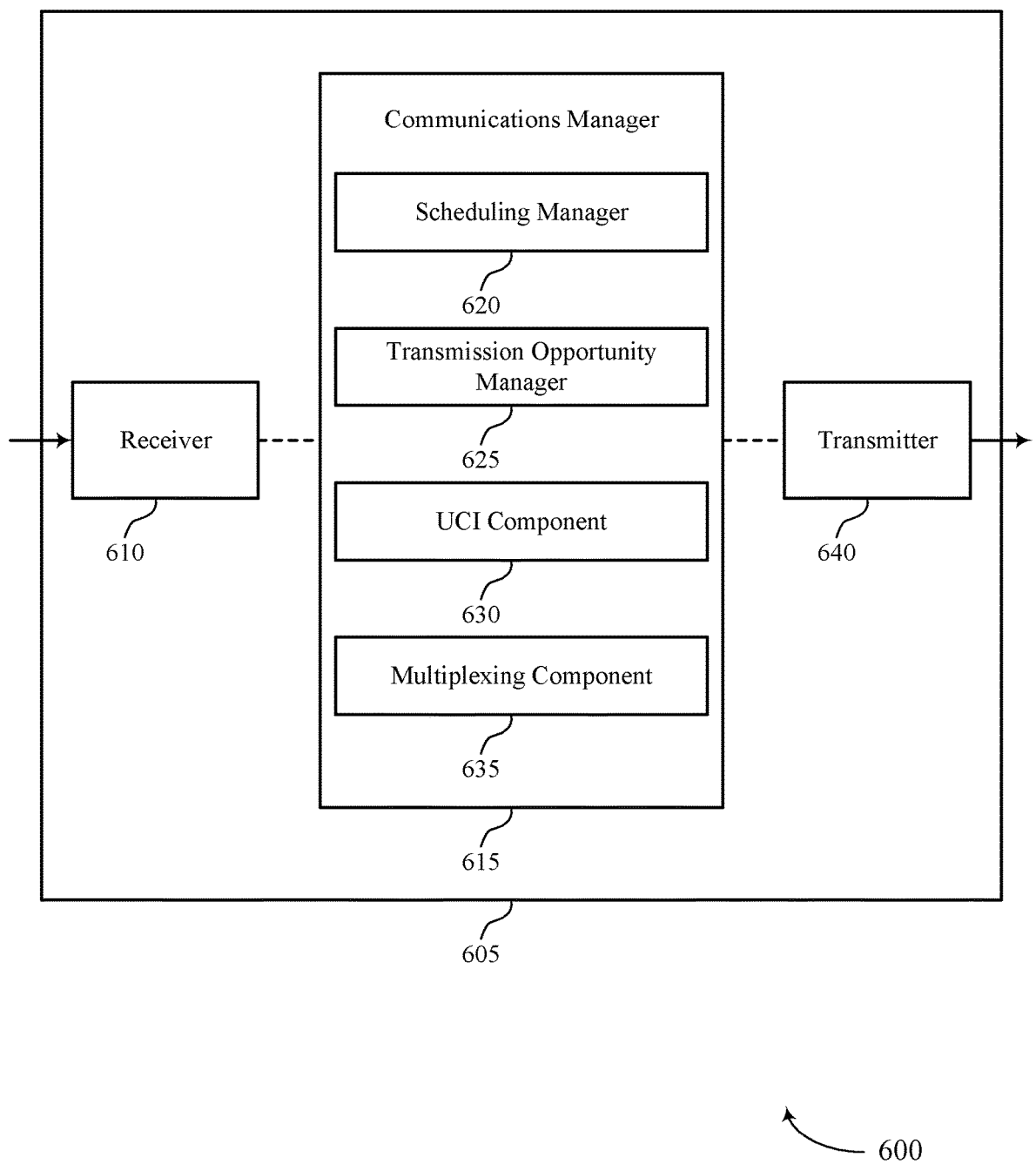

FIG. 6 shows a block diagram 600 of a device 605 that supports multiplexing uplink control information on uplink shared channel transmissions in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to multiplexing uplink control information on uplink shared channel transmissions, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a scheduling manager 620, a transmission opportunity manager 625, a UCI component 630, and a multiplexing component 635. The communications manager 615 may be an example of aspects of the communications manager 810 described herein.

The scheduling manager 620 may receive an uplink grant that schedules a transmission of an uplink shared channel using a first number of symbols.

The transmission opportunity manager 625 may identify, based on the uplink grant, at least a first uplink transmission opportunity and a second uplink transmission opportunity during which the uplink shared channel is to be transmitted, where at least one of the first uplink transmission opportunity or the second uplink transmission opportunity includes a second number of symbols different from the first number of symbols allocated for the uplink shared channel and transmit the uplink shared channel and the UCI during the at least one of the first uplink transmission opportunity and the second uplink transmission opportunity.

The UCI component 630 may identify UCI to be multiplexed on the uplink shared channel during at least one of the first uplink transmission opportunity and the second uplink transmission opportunity.

The multiplexing component 635 may multiplex the UCI on the uplink shared channel so as to maintain a same rate-matching scheme and a same coding scheme for each of the first uplink transmission opportunity and the second uplink transmission opportunity.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
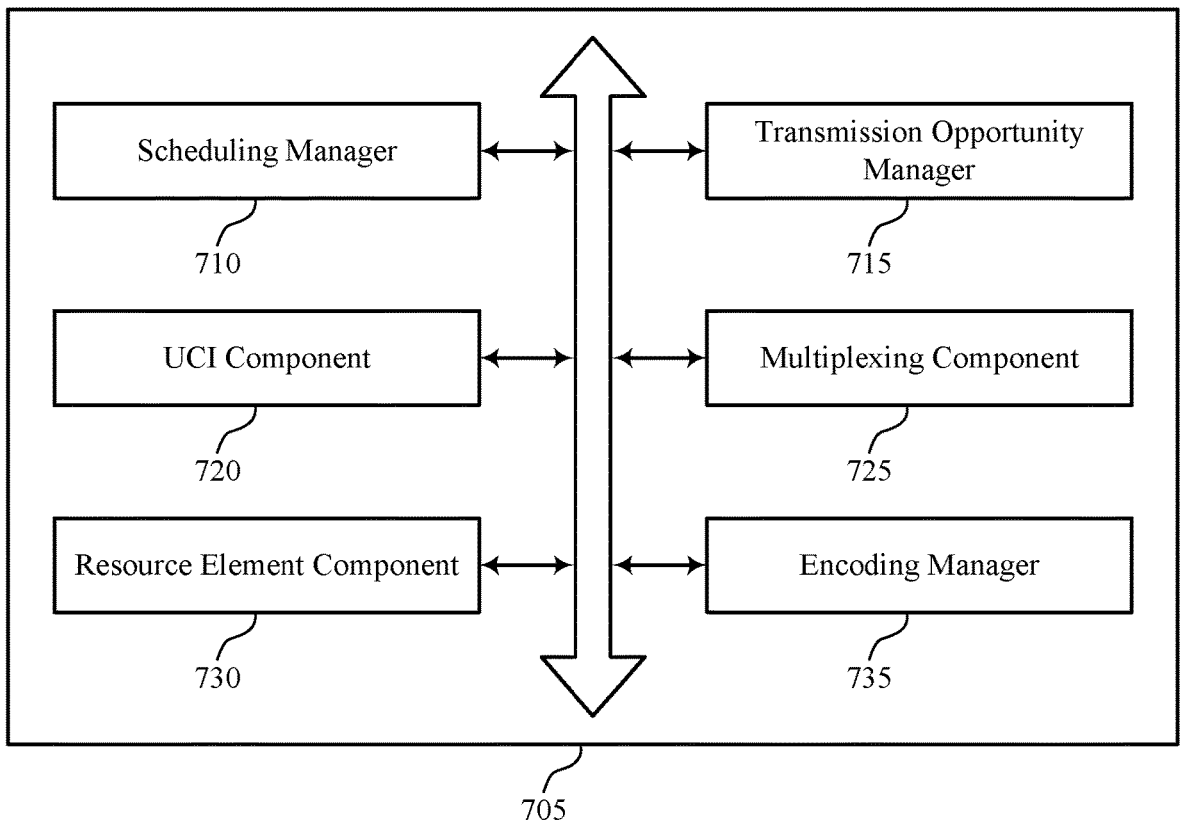
FIG. 7 shows a block diagram of a communications manager that supports multiplexing uplink control information on uplink shared channel transmissions in accordance with aspects of the present disclosure.

FIG. 7 shows a block diagram 700 of a communications manager 705 that supports multiplexing uplink control information on uplink shared channel transmissions in accordance with aspects of the present disclosure. The communications manager 705 may be an example of aspects of a communications manager 515, a communications manager 615, or a communications manager 810 described herein. The communications manager 705 may include a scheduling manager 710, a transmission opportunity manager 715, a UCI component 720, a multiplexing component 725, a resource element component 730, and an encoding manager 735. Each of these modules may communicate, directly or indirectly, with one another (e.g., via one or more buses).

The scheduling manager 710 may receive an uplink grant that schedules a transmission of an uplink shared channel using a first number of symbols. In some examples, the scheduling manager 710 may receive the uplink grant in DCI or via RRC signaling. In some cases, the uplink shared channel includes a PUSCH. In some cases, the A-CSI may be scheduled by a second uplink grant. In some cases, the uplink grant may comprise the second uplink grant.

The transmission opportunity manager 715 may identify, based on the uplink grant, at least a first uplink transmission opportunity and a second uplink transmission opportunity during which the uplink shared channel is to be transmitted, where at least one of the first uplink transmission opportunity or the second uplink transmission opportunity includes a second number of symbols different from the first number of symbols allocated for the uplink shared channel. In some examples, the transmission opportunity manager 715 may determine that at least one uplink shared channel in the first uplink transmission opportunity or the second uplink transmission opportunity includes the first number of symbols allocated for the uplink shared channel and at least one uplink shared channel in the first uplink transmission opportunity or the second uplink transmission opportunity includes the second number of symbols different from the first number of symbols.

In some examples, the transmission opportunity manager 715 may transmit the uplink shared channel and the UCI during the at least one of the first uplink transmission opportunity and the second uplink transmission opportunity.

In some examples, the transmission opportunity manager 715 may determine the uplink shared channel includes a URLLC transmission. In some examples, the transmission opportunity manager 715 may determine an uplink transmission opportunity overlaps with a PUCCH, where the PUCCH includes the UCI and the uplink transmission opportunity corresponds to at least one of the first uplink transmission opportunity or the second uplink transmission opportunity. In some examples, the transmission opportunity manager 715 may determine that at least one uplink shared channel in the first uplink transmission opportunity or the second uplink transmission opportunity satisfies a resource constraint based on a quantity of resource elements in the uplink shared channel, where the resource constraint includes a quantity of resource elements for transmitting the UCI that is not greater than the quantity of resource elements in the uplink shared channel. In some examples, the transmission opportunity manager 715 may determine that each uplink shared channel in the first uplink transmission opportunity and the second uplink transmission opportunity satisfies a resource constraint based on a quantity of resource elements in the uplink shared channel, where the resource constraint includes a quantity of resource elements for transmitting the UCI that is not greater than the quantity of resource elements in the uplink shared channel.

The UCI component 720 may identify UCI to be multiplexed on the uplink shared channel during at least one of the first uplink transmission opportunity and the second uplink transmission opportunity. In some examples, the UCI component 720 may determine the UCI includes a first portion and a second portion. In some cases, the UCI may include an ACK, a NACK, a CSI, an A-CSI, or a combination thereof.

In some examples, the UCI component 720 may determine a payload size of the UCI. In some examples, the UCI component 720 may determine the payload size of the UCI is above a threshold. In some examples, the UCI component 720 may determine the payload size of the UCI is below a threshold.

The multiplexing component 725 may multiplex the UCI on the uplink shared channel so as to maintain a same rate-matching scheme and a same coding scheme for each of the first uplink transmission opportunity and the second uplink transmission opportunity. In some examples, the multiplexing component 725 may multiplex the UCI on the at least one uplink shared channel that includes the first number of symbols. In some examples, the multiplexing component 725 may refrain from multiplexing the UCI on the at least one uplink shared channel that includes the second number of symbols.

In some examples, the multiplexing component 725 may multiplex the first portion of the UCI with the URLLC transmission. In some examples, the multiplexing component 725 may map the modulated symbols to resource elements of the uplink shared channel. In some examples, the multiplexing component 725 may multiplex the ACK, the NACK, the CSI, or a combination thereof, on the uplink shared channel in the uplink transmission opportunity that overlaps with the PUCCH. In some examples, the multiplexing component 725 may multiplex the ACK, the NACK, the CSI, or a combination thereof, on the at least one uplink shared channel that satisfies the resource constraint. In some cases, the quantity of resource elements in the uplink shared channel excludes a quantity of resource elements in one or more symbols that include a DMRS, a PTRS, or both. In some examples, the multiplexing component 725 may multiplex the ACK, the NACK, the CSI, or a combination thereof, on each uplink shared channel based on each uplink shared channel satisfying the resource constraint.

In some examples, the multiplexing component 725 may multiplex an A-CSI on the uplink shared channel in a selected transmission opportunity of the first uplink transmission opportunity or the second uplink transmission opportunity, wherein the UCI comprises the A-CSI. In some cases, the selected uplink transmission opportunity may be a last uplink transmission opportunity that includes the first number of symbols allocated for the uplink shared channel, as identified based on the uplink grant. In some cases, the selected uplink transmission opportunity may be a last uplink transmission opportunity identified based on the uplink grant, where the last uplink transmission opportunity includes either the first number of symbols allocated for the uplink shared channel or the second number of symbols different from the first number of symbols allocated for the uplink shared channel.

The resource element component 730 may allocate a first quantity of resource elements in the first uplink transmission opportunity to the UCI based on the rate-matching scheme and the coding scheme. In some examples, the resource element component 730 may allocate a second quantity of resource elements in the second uplink transmission opportunity to the UCI based on the rate-matching scheme and the coding scheme, where the second quantity is different from the first quantity. In some examples, the resource element component 730 may determine a quantity of resource elements for transmitting the UCI. In some examples, the resource element component 730 may determine a reference quantity of resource elements for the UCI.

In some cases, the reference quantity of resource elements for the UCI includes a first quantity of resource elements in the scheduled transmission of the uplink shared channel; a second quantity of resource elements in the first uplink transmission opportunity; a third quantity of resource elements in the second uplink transmission opportunity; the greater of the first quantity, the second quantity, and the third quantity; or the lesser of the first quantity, the second quantity, and the third quantity.

In some cases, the quantity of resource elements for transmitting the UCI includes a first quantity of resource elements in the scheduled transmission of the uplink shared channel, a second quantity of resource elements in the first uplink transmission opportunity, a third quantity of resource elements in the second uplink transmission opportunity, or the lesser of the first quantity, the second quantity, and the third quantity.

The encoding manager 735 may determine an output sequence length based on the reference quantity of resource elements and the rate-matching scheme. In some examples, the encoding manager 735 may encode the UCI into a sequence of coded bits using polar coding, a length of the sequence of coded bits corresponding to the output sequence length. In some examples, the encoding manager 735 may determine a quantity of coded bits based on the quantity of resource elements for transmitting the UCI.

In some examples, the encoding manager 735 may generate the quantity of coded bits based on the sequence of coded bits. In some examples, the encoding manager 735 may determine the quantity of coded bits is greater than the output sequence length. In some examples, the encoding manager 735 may cyclically extend the sequence of coded bits.

In some examples, the encoding manager 735 may encode the UCI into a sequence of encoded bits. In some examples, the encoding manager 735 may modulate symbols with the sequence of encoded bits based on the rate-matching scheme.

Figure 8:
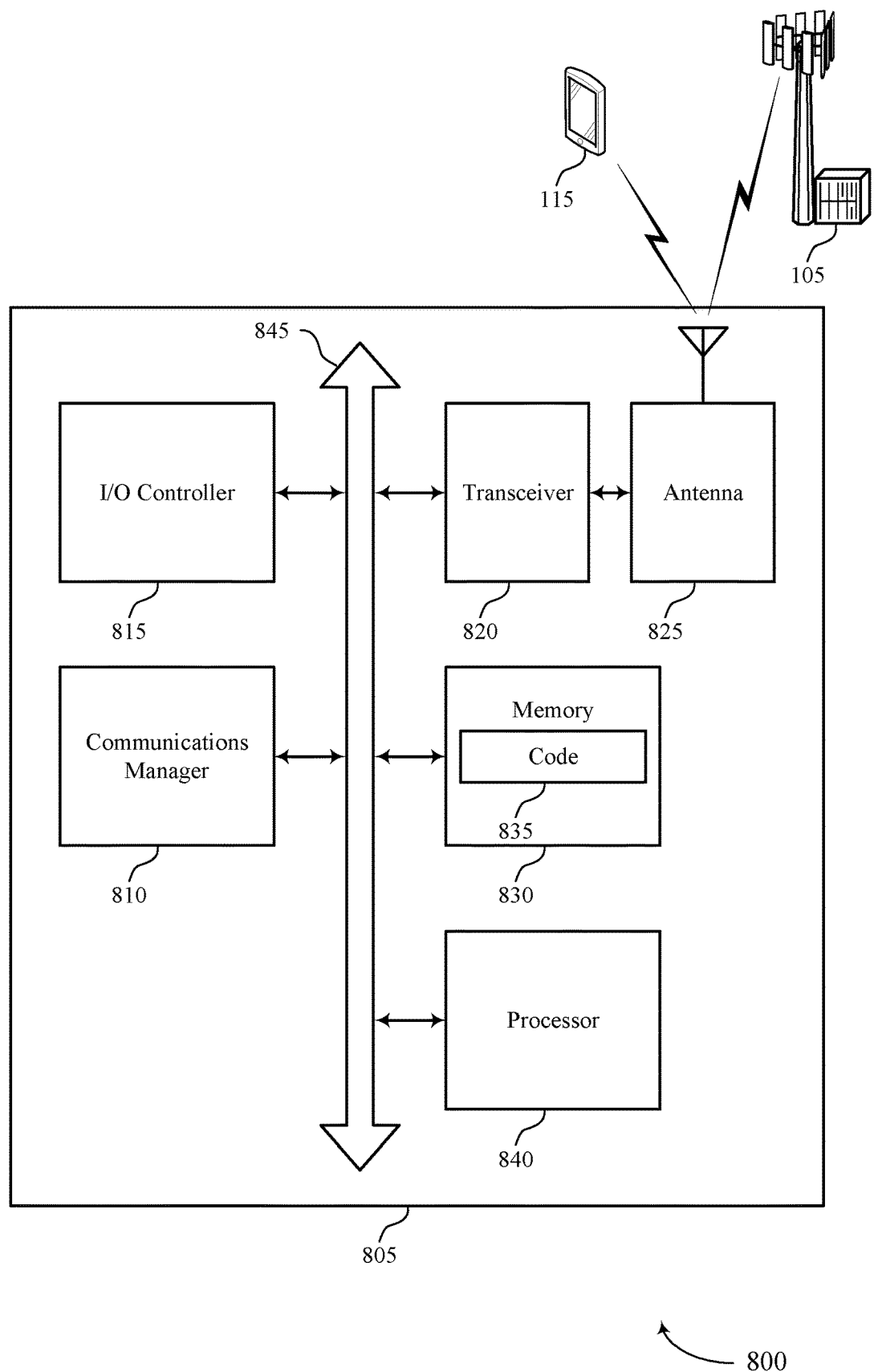
FIG. 8 shows a diagram of a system including a device that supports multiplexing uplink control information on uplink shared channel transmissions in accordance with aspects of the present disclosure.

FIG. 8 shows a diagram of a system 800 including a device 805 that supports multiplexing uplink control information on uplink shared channel transmissions in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive an uplink grant that schedules a transmission of an uplink shared channel using a first number of symbols, identify, based on the uplink grant, at least a first uplink transmission opportunity and a second uplink transmission opportunity during which the uplink shared channel is to be transmitted, where at least one of the first uplink transmission opportunity or the second uplink transmission opportunity includes a second number of symbols different from the first number of symbols allocated for the uplink shared channel, identify UCI to be multiplexed on the uplink shared channel during at least one of the first uplink transmission opportunity and the second uplink transmission opportunity, multiplex the UCI on the uplink shared channel so as to maintain a same rate-matching scheme and a same coding scheme for each of the first uplink transmission opportunity and the second uplink transmission opportunity, and transmit the uplink shared channel and the UCI during the at least one of the first uplink transmission opportunity and the second uplink transmission opportunity.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM), read-only memory (ROM), or a combination thereof. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a central processing unity (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting multiplexing uplink control information on uplink shared channel transmissions).

The processor 840 of the device 805 (e.g., controlling the receiver 510, the transmitter 520, or the transceiver 820) may reduce power consumption and increase UCI transmission reliability based on multiplexing the UCI on the uplink shared channel transmissions while maintaining the same rate-matching and coding scheme. In some examples, the processor 840 of the device 805 may reconfigure parameters for transmitting the UCI. For example, the processor 840 of the device 805 may turn on one or more processing units for performing a UCI transmission, increase a processing clock, or a similar mechanism within the device 805. As such, when subsequent UCI transmissions are required, the processor 840 may be ready to respond more efficiently through the reduction of a ramp up in processing power. The improvements in power saving and UCI transmission reliability may further increase battery life at the device 805 (for example, by reducing or eliminating unnecessary or failed UCI transmissions, etc.).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
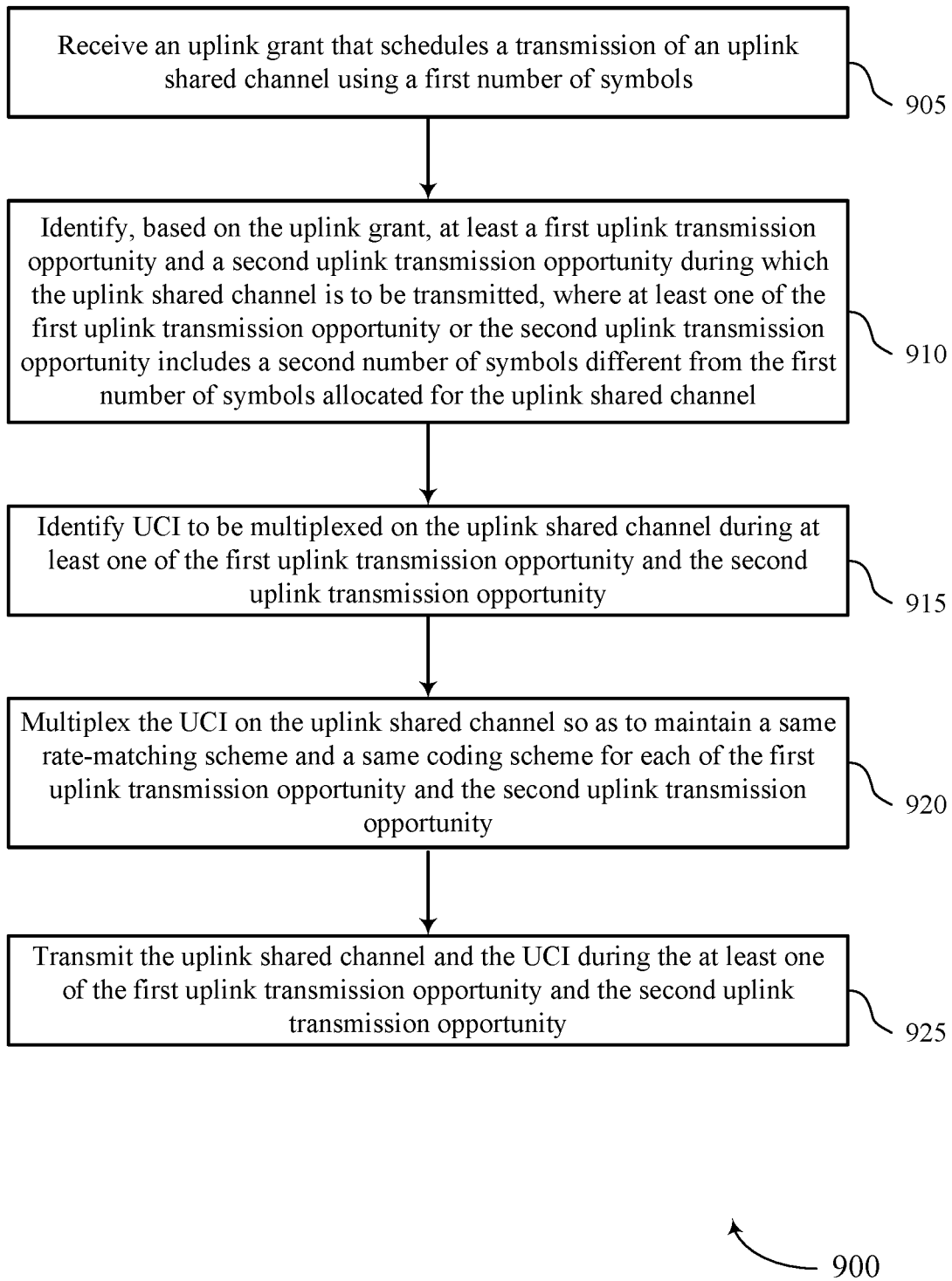
FIGS. 9 through 11 show flowcharts illustrating methods that support multiplexing uplink control information on uplink shared channel transmissions in accordance with aspects of the present disclosure.

FIG. 9 shows a flowchart illustrating a method 900 that supports multiplexing uplink control information on uplink shared channel transmissions in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive an uplink grant that schedules a transmission of an uplink shared channel using a first number of symbols. The operations of 905 may be performed according to the methods described herein. In some examples, aspects of the operations of 905 may be performed by a scheduling manager as described with reference to FIGS. 5 through 8.

At 910, the UE may identify, based on the uplink grant, at least a first uplink transmission opportunity and a second uplink transmission opportunity during which the uplink shared channel is to be transmitted, where at least one of the first uplink transmission opportunity or the second uplink transmission opportunity includes a second number of symbols different from the first number of symbols allocated for the uplink shared channel. The operations of 910 may be performed according to the methods described herein. In some examples, aspects of the operations of 910 may be performed by a transmission opportunity manager as described with reference to FIGS. 5 through 8.

At 915, the UE may identify UCI to be multiplexed on the uplink shared channel during at least one of the first uplink transmission opportunity and the second uplink transmission opportunity. The operations of 915 may be performed according to the methods described herein. In some examples, aspects of the operations of 915 may be performed by a UCI component as described with reference to FIGS. 5 through 8.

At 920, the UE may multiplex the UCI on the uplink shared channel so as to maintain a same rate-matching scheme and a same coding scheme for each of the first uplink transmission opportunity and the second uplink transmission opportunity. The operations of 920 may be performed according to the methods described herein. In some examples, aspects of the operations of 920 may be performed by a multiplexing component as described with reference to FIGS. 5 through 8.

At 925, the UE may transmit the uplink shared channel and the UCI during the at least one of the first uplink transmission opportunity and the second uplink transmission opportunity. The operations of 925 may be performed according to the methods described herein. In some examples, aspects of the operations of 925 may be performed by a transmission opportunity manager as described with reference to FIGS. 5 through 8.

Figure 10:
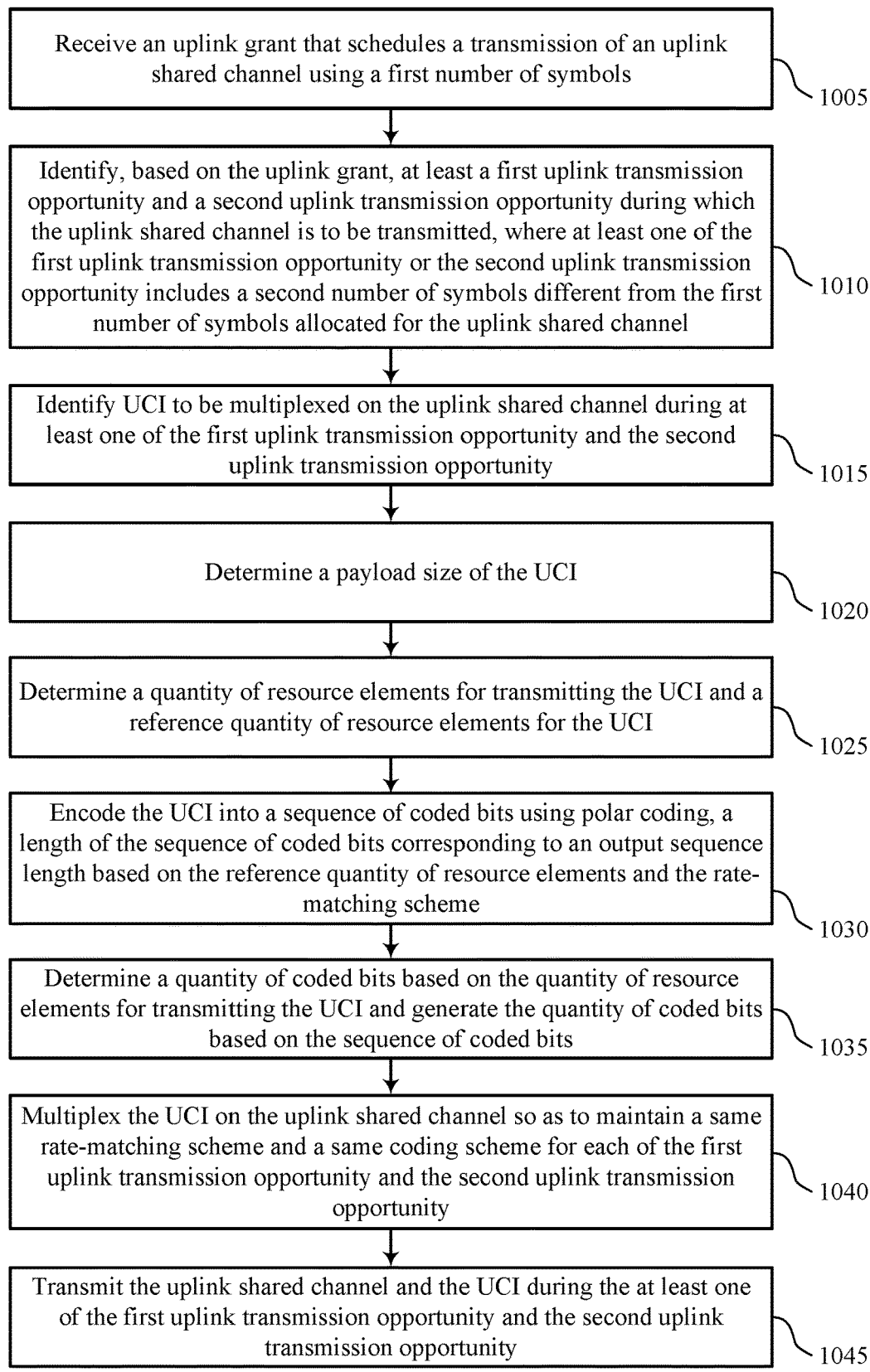

FIG. 10 shows a flowchart illustrating a method 1000 that supports multiplexing uplink control information on uplink shared channel transmissions in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive an uplink grant that schedules a transmission of an uplink shared channel using a first number of symbols. The operations of 1005 may be performed according to the methods described herein. In some examples, aspects of the operations of 1005 may be performed by a scheduling manager as described with reference to FIGS. 5 through 8.

At 1010, the UE may identify, based on the uplink grant, at least a first uplink transmission opportunity and a second uplink transmission opportunity during which the uplink shared channel is to be transmitted, where at least one of the first uplink transmission opportunity or the second uplink transmission opportunity includes a second number of symbols different from the first number of symbols allocated for the uplink shared channel. The operations of 1010 may be performed according to the methods described herein. In some examples, aspects of the operations of 1010 may be performed by a transmission opportunity manager as described with reference to FIGS. 5 through 8.

At 1015, the UE may identify UCI to be multiplexed on the uplink shared channel during at least one of the first uplink transmission opportunity and the second uplink transmission opportunity. The operations of 1015 may be performed according to the methods described herein. In some examples, aspects of the operations of 1015 may be performed by a UCI component as described with reference to FIGS. 5 through 8.

At 1020, the UE may determine a payload size of the UCI. The operations of 1020 may be performed according to the methods described herein. In some examples, aspects of the operations of 1020 may be performed by a UCI component as described with reference to FIGS. 5 through 8.

At 1025, the UE may determine a quantity of resource elements for transmitting the UCI and a reference quantity of resource elements for the UCI. The operations of 1025 may be performed according to the methods described herein. In some examples, aspects of the operations of 1025 may be performed by a resource element component as described with reference to FIGS. 5 through 8.

At 1030, the UE may encode the UCI into a sequence of coded bits using polar coding, a length of the sequence of coded bits corresponding to an output sequence length based on the reference quantity of resource elements and the rate-matching scheme. The operations of 1030 may be performed according to the methods described herein. In some examples, aspects of the operations of 1030 may be performed by an encoding manager as described with reference to FIGS. 5 through 8.

At 1035, the UE may determine a quantity of coded bits based on the quantity of resource elements for transmitting the UCI and generate the quantity of coded bits based on the sequence of coded bits. The operations of 1035 may be performed according to the methods described herein. In some examples, aspects of the operations of 1035 may be performed by an encoding manager as described with reference to FIGS. 5 through 8.

At 1040, the UE may multiplex the UCI on the uplink shared channel so as to maintain a same rate-matching scheme and a same coding scheme for each of the first uplink transmission opportunity and the second uplink transmission opportunity. The operations of 1040 may be performed according to the methods described herein. In some examples, aspects of the operations of 1040 may be performed by a multiplexing component as described with reference to FIGS. 5 through 8.

At 1045, the UE may transmit the uplink shared channel and the UCI during the at least one of the first uplink transmission opportunity and the second uplink transmission opportunity. The operations of 1045 may be performed according to the methods described herein. In some examples, aspects of the operations of 1045 may be performed by a transmission opportunity manager as described with reference to FIGS. 5 through 8.

Figure 11:
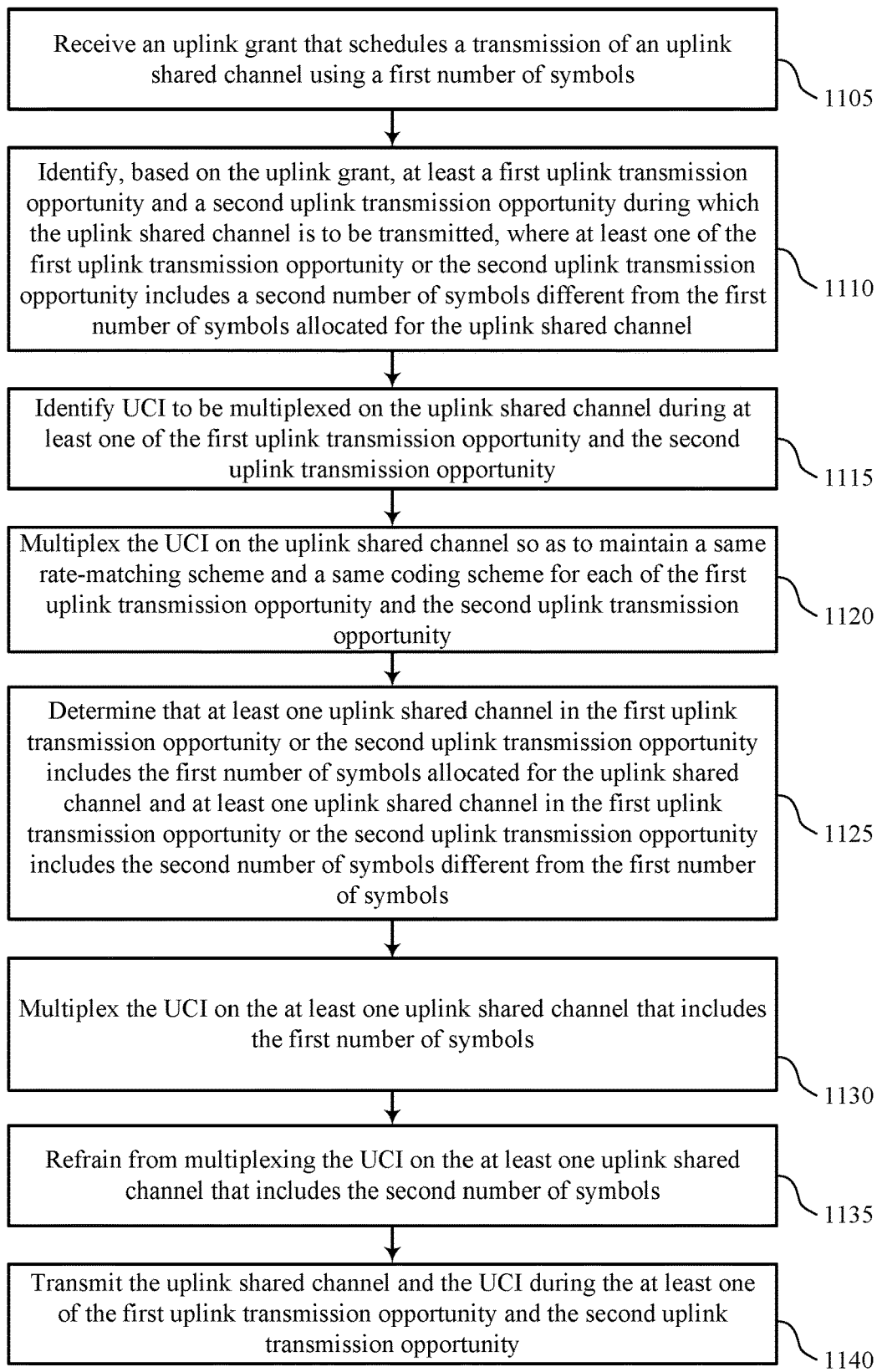

FIG. 11 shows a flowchart illustrating a method 1100 that supports multiplexing uplink control information on uplink shared channel transmissions in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may receive an uplink grant that schedules a transmission of an uplink shared channel using a first number of symbols. The operations of 1105 may be performed according to the methods described herein. In some examples, aspects of the operations of 1105 may be performed by a scheduling manager as described with reference to FIGS. 5 through 8.

At 1110, the UE may identify, based on the uplink grant, at least a first uplink transmission opportunity and a second uplink transmission opportunity during which the uplink shared channel is to be transmitted, where at least one of the first uplink transmission opportunity or the second uplink transmission opportunity includes a second number of symbols different from the first number of symbols allocated for the uplink shared channel. The operations of 1110 may be performed according to the methods described herein. In some examples, aspects of the operations of 1110 may be performed by a transmission opportunity manager as described with reference to FIGS. 5 through 8.

At 1115, the UE may identify UCI to be multiplexed on the uplink shared channel during at least one of the first uplink transmission opportunity and the second uplink transmission opportunity. The operations of 1115 may be performed according to the methods described herein. In some examples, aspects of the operations of 1115 may be performed by a UCI component as described with reference to FIGS. 5 through 8.

At 1120, the UE may multiplex the UCI on the uplink shared channel so as to maintain a same rate-matching scheme and a same coding scheme for each of the first uplink transmission opportunity and the second uplink transmission opportunity. The operations of 1120 may be performed according to the methods described herein. In some examples, aspects of the operations of 1120 may be performed by a multiplexing component as described with reference to FIGS. 5 through 8.

At 1125, the UE may determine that at least one uplink shared channel in the first uplink transmission opportunity or the second uplink transmission opportunity includes the first number of symbols allocated for the uplink shared channel and at least one uplink shared channel in the first uplink transmission opportunity or the second uplink transmission opportunity includes the second number of symbols different from the first number of symbols. The operations of 1125 may be performed according to the methods described herein. In some examples, aspects of the operations of 1125 may be performed by a transmission opportunity manager as described with reference to FIGS. 5 through 8.

At 1130, the UE may multiplex the UCI on the at least one uplink shared channel that includes the first number of symbols. The operations of 1130 may be performed according to the methods described herein. In some examples, aspects of the operations of 1130 may be performed by a UCI component as described with reference to FIGS. 5 through 8.

At 1135, the UE may refrain from multiplexing the UCI on the at least one uplink shared channel that includes the second number of symbols. The operations of 1135 may be performed according to the methods described herein. In some examples, aspects of the operations of 1135 may be performed by a transmission opportunity manager as described with reference to FIGS. 5 through 8.

At 1140, the UE may transmit the uplink shared channel and the UCI during the at least one of the first uplink transmission opportunity and the second uplink transmission opportunity. The operations of 1140 may be performed according to the methods described herein. In some examples, aspects of the operations of 1140 may be performed by a transmission opportunity manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of examples of the present invention:

Example 1: A method for wireless communications, comprising: receiving an uplink grant that schedules a transmission of an uplink shared channel using a first number of symbols; identifying, based at least in part on the uplink grant, at least a first uplink transmission opportunity and a second uplink transmission opportunity during which the uplink shared channel is to be transmitted, wherein at least one of the first uplink transmission opportunity or the second uplink transmission opportunity includes a second number of symbols different from the first number of symbols allocated for the uplink shared channel; identifying uplink control information (UCI) to be multiplexed on the uplink shared channel during at least one of the first uplink transmission opportunity and the second uplink transmission opportunity; multiplexing the UCI on the uplink shared channel so as to maintain a same rate-matching scheme and a same coding scheme for each of the first uplink transmission opportunity and the second uplink transmission opportunity; and transmitting the uplink shared channel and the UCI during the at least one of the first uplink transmission opportunity and the second uplink transmission opportunity.

Example 2: The method of example 1, further comprising: allocating a first quantity of resource elements in the first uplink transmission opportunity to the UCI based at least in part on the rate-matching scheme and the coding scheme; and allocating a second quantity of resource elements in the second uplink transmission opportunity to the UCI based at least in part on the rate-matching scheme and the coding scheme, wherein the second quantity is different from the first quantity.

Example 3: The method of any one of examples 1 or 2, further comprising: determining that at least one uplink shared channel in the first uplink transmission opportunity or the second uplink transmission opportunity includes the first number of symbols allocated for the uplink shared channel and at least one uplink shared channel in the first uplink transmission opportunity or the second uplink transmission opportunity includes the second number of symbols different from the first number of symbols; multiplexing the UCI on the at least one uplink shared channel that includes the first number of symbols; and refraining from multiplexing the UCI on the at least one uplink shared channel that includes the second number of symbols Example 4: The method of any one of examples 1 through 3, further comprising: determining the uplink shared channel comprises an ultra-reliable low latency communications (URLLC) transmission; determining the UCI comprises a first portion and a second portion; and multiplexing the first portion of the UCI with the URLLC transmission.

Example 5: The method of any one of examples 1 through 4, further comprising: determining a payload size of the UCI; determining a quantity of resource elements for transmitting the UCI; and determining a reference quantity of resource elements for the UCI.

Example 6: The method of example 5, further comprising: determining an output sequence length based at least in part on the reference quantity of resource elements and the rate-matching scheme; encoding the UCI into a sequence of coded bits using polar coding, a length of the sequence of coded bits corresponding to the output sequence length; determining a quantity of coded bits based at least in part on the quantity of resource elements for transmitting the UCI; and generating the quantity of coded bits based at least in part on the sequence of coded bits.

Example 7: The method of example 6, wherein generating the quantity of coded bits comprises: determining the quantity of coded bits is greater than the output sequence length; and cyclically extending the sequence of coded bits.

Example 8: The method of any one of examples 6 or 7, wherein the reference quantity of resource elements for the UCI comprises a first quantity of resource elements in the scheduled transmission of the uplink shared channel, a second quantity of resource elements in the at least one of the first uplink transmission opportunity and the second uplink transmission opportunity, the greater of the first quantity and the second quantity, or the lesser of the first quantity and the second quantity.

Example 9: The method of any one of examples 6 through 8, wherein the rate-matching scheme is determined based at least in part on the payload size of the UCI and the reference quantity of resource elements for the UCI.

Example 10: The method of any one of examples 5 through 9, further comprising: determining the payload size of the UCI is below a threshold; encoding the UCI into a sequence of encoded bits; and modulating symbols with the sequence of encoded bits based at least in part on the rate-matching scheme.

Example 11: The method of example 10, wherein the multiplexing comprises: mapping the modulated symbols to resource elements of the uplink shared channel.

Example 12: The method of any one of examples 5 through 11, wherein the quantity of resource elements for transmitting the UCI comprises a first quantity of resource elements in the scheduled transmission of the uplink shared channel, a second quantity of resource elements in the at least one of the first uplink transmission opportunity and the second uplink transmission opportunity, or the lesser of the first quantity and the second quantity.

Example 13: The method of any one of examples 1 through 12, wherein the uplink shared channel comprises a physical uplink shared channel (PUSCH).

Example 14: The method of any one of examples 1 through 13, further comprising: receiving the uplink grant in downlink control information (DCI) or via radio resource control (RRC) signaling.

Example 15: The method of any one of examples 1 through 14, wherein the UCI comprises an acknowledgment (ACK), a negative acknowledgment (NACK), a channel state information (CSI), an aperiodic CSI (A-CSI), or a combination thereof.

Example 16: The method of example 15, wherein the A-CSI is scheduled by a second uplink grant.

Example 17: The method of example 16, wherein the uplink grant comprises the second uplink grant.

Example 18: The method of any one of examples 15 through 17, further comprising: determining an uplink transmission opportunity overlaps with a physical uplink control channel (PUCCH), wherein the PUCCH comprises the UCI and the uplink transmission opportunity corresponds to at least one of the first uplink transmission opportunity or the second uplink transmission opportunity.

Example 19: The method of example 18, further comprising: multiplexing the ACK, the NACK, the CSI, or a combination thereof, on the uplink shared channel in the uplink transmission opportunity that overlaps with the PUCCH.

Example 20: The method of any one of examples 18 or 19, further comprising: determining that at least one uplink shared channel in the first uplink transmission opportunity or the second uplink transmission opportunity satisfies a resource constraint based at least in part on a quantity of resource elements in the uplink shared channel, wherein the resource constraint includes a quantity of resource elements for transmitting the UCI that is not greater than the quantity of resource elements in the uplink shared channel; and multiplexing the ACK, the NACK, the CSI, or a combination thereof, on the at least one uplink shared channel that satisfies the resource constraint.

Example 21: The method of example 20, wherein the quantity of resource elements in the uplink shared channel excludes a quantity of resource elements in one or more symbols that include a demodulation reference signal, a phase-tracking reference signal, or both.

Example 22: The method of any one of examples 18 through 21, further comprising: determining that each uplink shared channel in the first uplink transmission opportunity and the second uplink transmission opportunity satisfies a resource constraint based at least in part on a quantity of resource elements in the uplink shared channel, wherein the resource constraint includes a quantity of resource elements for transmitting the UCI that is not greater than the quantity of resource elements in the uplink shared channel; and multiplexing the ACK, the NACK, the CSI, or a combination thereof, on each uplink shared channel based at least in part on each uplink shared channel satisfying the resource constraint.

Example 23: The method of any one of examples 1 through 22, further comprising: multiplexing an aperiodic channel state information (A-CSI) on the uplink shared channel in a selected transmission opportunity of the first uplink transmission opportunity or the second uplink transmission opportunity, wherein the UCI comprises the A-CSI.

Example 24: The method of example 23, wherein the selected uplink transmission opportunity is a last uplink transmission opportunity that includes the first number of symbols allocated for the uplink shared channel, as identified based at least in part on the uplink grant.

Example 25: The method of any one of examples 23 or 24, wherein the selected uplink transmission opportunity is a last uplink transmission opportunity identified based at least in part on the uplink grant, the last uplink transmission opportunity includes either the first number of symbols allocated for the uplink shared channel or the second number of symbols different from the first number of symbols allocated for the uplink shared channel.

Example 26: An apparatus for wireless communications comprising at least one means for performing a method of any one of examples 1 through 25.

Example 27: An apparatus for wireless communications comprising a processor; memory coupled with the processor; and instructions stored in the memory and executable by the processor to cause the apparatus to perform a method of any one of examples 1 through 25.

Example 28: A non-transitory computer-readable medium storing code for wireless communications for wireless communications the code comprising instructions executable by a processor to perform a method of any one of examples 1 through 25.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   one or more memories storing processor-executable code; and
   one or more processors coupled with the one or more memories and individually or collectively operable to execute the code to cause the apparatus to:

receive an uplink grant that schedules a transmission of an uplink shared channel using a first number of symbols that define a nominal repetition, the uplink grant identifying at least a first uplink transmission opportunity and a second uplink transmission opportunity during which the uplink shared channel is to be transmitted, wherein the first uplink transmission opportunity includes a second number of symbols less than the first number of symbols allocated for the uplink shared channel and the second uplink transmission opportunity includes the first number of symbols, the second number of symbols defining the first uplink transmission opportunity as a non-nominal repetition;

multiplex uplink control information (UCI) on the uplink shared channel in the first uplink transmission opportunity based at least in part on the first uplink transmission opportunity including the second number of symbols, wherein the UCI comprises an acknowledgement/negative-acknowledgement (ACK/NACK) feedback;

transmit the uplink shared channel and the UCI comprising the ACK/NACK feedback during the non-nominal repetition in the first uplink transmission opportunity; and transmit channel state information (CSI) feedback on the uplink shared channel during the nominal repetition and in the second uplink transmission opportunity based at least in part on the second uplink transmission opportunity including the first number of symbols.

2. The apparatus of claim 1, wherein the one or more processors are individually or collectively further operable to execute the code to cause the apparatus to:
determine the uplink shared channel comprises an ultra-reliable low latency communications (URLLC) transmission;
determine the UCI comprises a first portion and a second portion; and
multiplex the first portion of the UCI with the URLLC transmission.

3. The apparatus of claim 1, wherein the one or more processors are individually or collectively further operable to execute the code to cause the apparatus to:
determine a payload size of the UCI;
determine a quantity of resource elements for transmitting the UCI; and
determine a reference quantity of resource elements for the UCI.

4. The apparatus of claim 3, wherein the one or more processors are individually or collectively further operable to execute the code to cause the apparatus to:
determine an output sequence length based at least in part on the reference quantity of resource elements and a rate-matching scheme;
encode the UCI into a sequence of coded bits using polar coding, a length of the sequence of coded bits corresponding to the output sequence length;
determine a quantity of coded bits based at least in part on the quantity of resource elements for transmitting the UCI; and
generate the quantity of coded bits based at least in part on the sequence of coded bits.

5. The apparatus of claim 3, wherein the reference quantity of resource elements for the UCI comprises a first quantity of resource elements in the scheduled transmission of the uplink shared channel, a second quantity of resource elements in the at least one of the first uplink transmission opportunity and the second uplink transmission opportunity, a greater of the first quantity and the second quantity, or a lesser of the first quantity and the second quantity.

6. The apparatus of claim 3, wherein a rate-matching scheme is determined based at least in part on the payload size of the UCI and the reference quantity of resource elements for the UCI.

7. The apparatus of claim 3, wherein the quantity of resource elements for transmitting the UCI comprises a first quantity of resource elements in the scheduled transmission of the uplink shared channel, a second quantity of resource elements in the at least one of the first uplink transmission opportunity and the second uplink transmission opportunity, or a lesser of the first quantity and the second quantity.

8. The apparatus of claim 1, wherein the uplink shared channel comprises a physical uplink shared channel (PUSCH).

9. The apparatus of claim 1, wherein the one or more processors are individually or collectively further operable to execute the code to cause the apparatus to:
receive the uplink grant in downlink control information (DCI) or via radio resource control (RRC) signaling.

10. The apparatus of claim 1, wherein the one or more processors are individually or collectively further operable to execute the code to cause the apparatus to:
determine an uplink transmission opportunity overlaps with a physical uplink control channel (PUCCH), wherein the PUCCH comprises the UCI and the uplink transmission opportunity corresponds to the first uplink transmission opportunity.

11. The apparatus of claim 10, wherein the one or more processors are individually or collectively further operable to execute the code to cause the apparatus to:
multiplex the ACK/NACK feedback on the uplink shared channel in the uplink transmission opportunity that overlaps with the PUCCH.

12. The apparatus of claim 10, wherein the one or more processors are individually or collectively further operable to execute the code to cause the apparatus to:
determine that at least one uplink shared channel in the first uplink transmission opportunity satisfies a resource constraint based at least in part on a quantity of resource elements in the uplink shared channel, wherein the resource constraint includes a quantity of resource elements for transmitting the UCI that is not greater than the quantity of resource elements in the uplink shared channel; and
multiplex the ACK/NACK feedback on the at least one uplink shared channel that satisfies the resource constraint.

13. The apparatus of claim 12, wherein the quantity of resource elements in the uplink shared channel excludes a quantity of resource elements in one or more symbols that include a demodulation reference signal, a phase-tracking reference signal, or both.

14. A method for wireless communications, comprising:
receiving an uplink grant that schedules a transmission of an uplink shared channel using a first number of symbols that define a nominal repetition, the uplink grant identifying at least a first uplink transmission opportunity and a second uplink transmission opportunity during which the uplink shared channel is to be transmitted, wherein the first uplink transmission opportunity includes a second number of symbols less than the first number of symbols allocated for the uplink shared channel and the second uplink transmission opportunity includes the first number of symbols, the second number of symbols defining the first uplink transmission opportunity as a non-nominal repetition;

multiplexing uplink control information (UCI) on the uplink shared channel in the first uplink transmission opportunity based at least in part on the first uplink transmission opportunity including the second number of symbols, wherein the UCI comprises an acknowledgement/negative-acknowledgement (ACK/NACK) feedback;

transmitting the uplink shared channel and the UCI comprising the ACK/NACK feedback during the non-nominal repetition in the first uplink transmission opportunity; and transmitting channel state information (CSI) feedback on the uplink shared channel during the nominal repetition and in the second uplink transmission opportunity based at least in part on the second uplink transmission opportunity including the first number of symbols.

15. The method of claim 14, further comprising:
determining the uplink shared channel comprises an ultra-reliable low latency communications (URLLC) transmission;
determining the UCI comprises a first portion and a second portion; and
multiplexing the first portion of the UCI with the URLLC transmission.

16. The method of claim 14, further comprising:
determining a payload size of the UCI;
determining a quantity of resource elements for transmitting the UCI; and
determining a reference quantity of resource elements for the UCI.

17. The method of claim 16, further comprising:
determining an output sequence length based at least in part on the reference quantity of resource elements and a rate-matching scheme;
encoding the UCI into a sequence of coded bits using polar coding, a length of the sequence of coded bits corresponding to the output sequence length;
determining a quantity of coded bits based at least in part on the quantity of resource elements for transmitting the UCI; and
generating the quantity of coded bits based at least in part on the sequence of coded bits.

18. The method of claim 16, wherein the reference quantity of resource elements for the UCI comprises a first quantity of resource elements in the scheduled transmission of the uplink shared channel, a second quantity of resource elements in the at least one of the first uplink transmission opportunity and the second uplink transmission opportunity, a greater of the first quantity and the second quantity, or a lesser of the first quantity and the second quantity.

19. The method of claim 16, wherein a rate-matching scheme is determined based at least in part on the payload size of the UCI and the reference quantity of resource elements for the UCI.

20. The method of claim 16, wherein the quantity of resource elements for transmitting the UCI comprises a first quantity of resource elements in the scheduled transmission of the uplink shared channel, a second quantity of resource elements in the at least one of the first uplink transmission opportunity and the second uplink transmission opportunity, or a lesser of the first quantity and the second quantity.

21. The method of claim 14, wherein the uplink shared channel comprises a physical uplink shared channel (PUSCH).

22. The method of claim 14, further comprising:
receiving the uplink grant in downlink control information (DCI) or via radio resource control (RRC) signaling.

23. The method of claim 14, further comprising:
determining an uplink transmission opportunity overlaps with a physical uplink control channel (PUCCH), wherein the PUCCH comprises the UCI and the uplink transmission opportunity corresponds to the first uplink transmission opportunity.

24. The method of claim 23, further comprising:
multiplexing the ACK/NACK feedback on the uplink shared channel in the uplink transmission opportunity that overlaps with the PUCCH.

25. The method of claim 23, further comprising:
determining that at least one uplink shared channel in the first uplink transmission opportunity satisfies a resource constraint based at least in part on a quantity of resource elements in the uplink shared channel, wherein the resource constraint includes a quantity of resource elements for transmitting the UCI that is not greater than the quantity of resource elements in the uplink shared channel; and
multiplexing the ACK/NACK feedback on the at least one uplink shared channel that satisfies the resource constraint.

26. The method of claim 25, wherein the quantity of resource elements in the uplink shared channel excludes a quantity of resource elements in one or more symbols that include a demodulation reference signal, a phase-tracking reference signal, or both.

27. An apparatus, comprising:
a processing system that includes processor circuitry and memory circuitry that stores code, the processing system configured to cause the apparatus to:
receive an uplink grant that schedules a transmission of an uplink shared channel using a first number of symbols that define a nominal repetition, the uplink grant identifying at least a first uplink transmission opportunity and a second uplink transmission opportunity during which the uplink shared channel is to be transmitted, wherein the first uplink transmission opportunity includes a second number of symbols less than the first number of symbols allocated for the uplink shared channel and the second uplink transmission opportunity includes the first number of symbols, the second number of symbols defining the first uplink transmission opportunity as a non-nominal repetition;
multiplex uplink control information (UCI) on the uplink shared channel in the first uplink transmission opportunity based at least in part on the first uplink transmission opportunity including the second number of symbols, wherein the UCI comprises an acknowledgement/negative-acknowledgement (ACK/NACK) feedback;
transmit the uplink shared channel and the UCI comprising the ACK/NACK feedback during the non-nominal repetition in the first uplink transmission opportunity; and
transmit channel state information (CSI) feedback on the uplink shared channel during the nominal repetition and in the second uplink transmission opportunity based at least in part on the second uplink transmission opportunity including the first number of symbols.

28. An apparatus for wireless communications, comprising:
- means for receiving an uplink grant that schedules a transmission of an uplink shared channel using a first number of symbols that define a nominal repetition, the uplink grant identifying at least a first uplink transmission opportunity and a second uplink transmission opportunity during which the uplink shared channel is to be transmitted, wherein the first uplink transmission opportunity includes a second number of symbols less than the first number of symbols allocated for the uplink shared channel and the second uplink transmission opportunity includes the first number of symbols, the second number of symbols defining the first uplink transmission opportunity as a non-nominal repetition;
- means for multiplexing uplink control information (UCI) on the uplink shared channel in the first uplink transmission opportunity based at least in part on the first uplink transmission opportunity including the second number of symbols, wherein the UCI comprises an acknowledgement/negative-acknowledgement (ACK/NACK) feedback;
- means for transmitting the uplink shared channel and the UCI comprising the ACK/NACK feedback during the non-nominal repetition in the first uplink transmission opportunity; and
- means for transmitting channel state information (CSI) feedback on the uplink shared channel during the nominal repetition and in the second uplink transmission opportunity based at least in part on the second uplink transmission opportunity including the first number of symbols.

* * * * *